United States Patent [19]

Iwasaki

[11] 4,339,956

[45] Jul. 20, 1982

[54] PRESSURE SENSOR

[75] Inventor: Shinichiro Iwasaki, Auburn Heights, Mich.

[73] Assignee: Aisin Seiki Company, Ltd., Kariya, Japan

[21] Appl. No.: 182,848

[22] Filed: Aug. 29, 1980

[51] Int. Cl.³ .............................................. G01L 9/10
[52] U.S. Cl. ..................................... 73/728; 336/30
[58] Field of Search .................... 73/722, 725, 728; 324/201, 207, 208; 336/30

[56] References Cited

U.S. PATENT DOCUMENTS

| | | | |
|---|---|---|---|
| 3,168,830 | 2/1965 | Chass | 73/722 |
| 3,807,223 | 4/1974 | Juillerat et al. | 73/722 |
| 4,042,899 | 8/1977 | Tomczak et al. | 73/728 X |
| 4,170,498 | 10/1979 | Jost et al. | 73/722 X |
| 4,226,126 | 10/1980 | Herden | 73/722 X |

OTHER PUBLICATIONS

"Force and Displacement Transducers . . . " by Mohri et al. from *Electrical Engineering in Japan*, vol. 99, No. 2, pp. 105-112, Feb. 1979.

*Primary Examiner*—James J. Gill
*Attorney, Agent, or Firm*—Oblon, Fisher, Spivak, McClelland & Maier

[57] ABSTRACT

A pressure sensor comprising a pressure-stress conversion mechanism including a movable body which is driven by a hydraulic pressure to be determined; a spring means which urges the movable body in a direction to oppose the pressure applied; a stress-pulse phase conversion unit connected to the movable body for producing a stress in accordance with the magnitude of the pressure in response to a load applied by the movable body and including a member of an amorphous, magnetically soft metal material having an electrical coil disposed thereon. A pulse voltage is applied to one end of the electrical coil, the other end of which is connected in series with a resistor in order to detect a voltage drop across the latter. The time delay of the voltage drop with respect to the pulse voltage, which depends on the magnitude of the hydraulic pressure, is indicated in the form of an analog voltage or a digital code.

6 Claims, 54 Drawing Figures

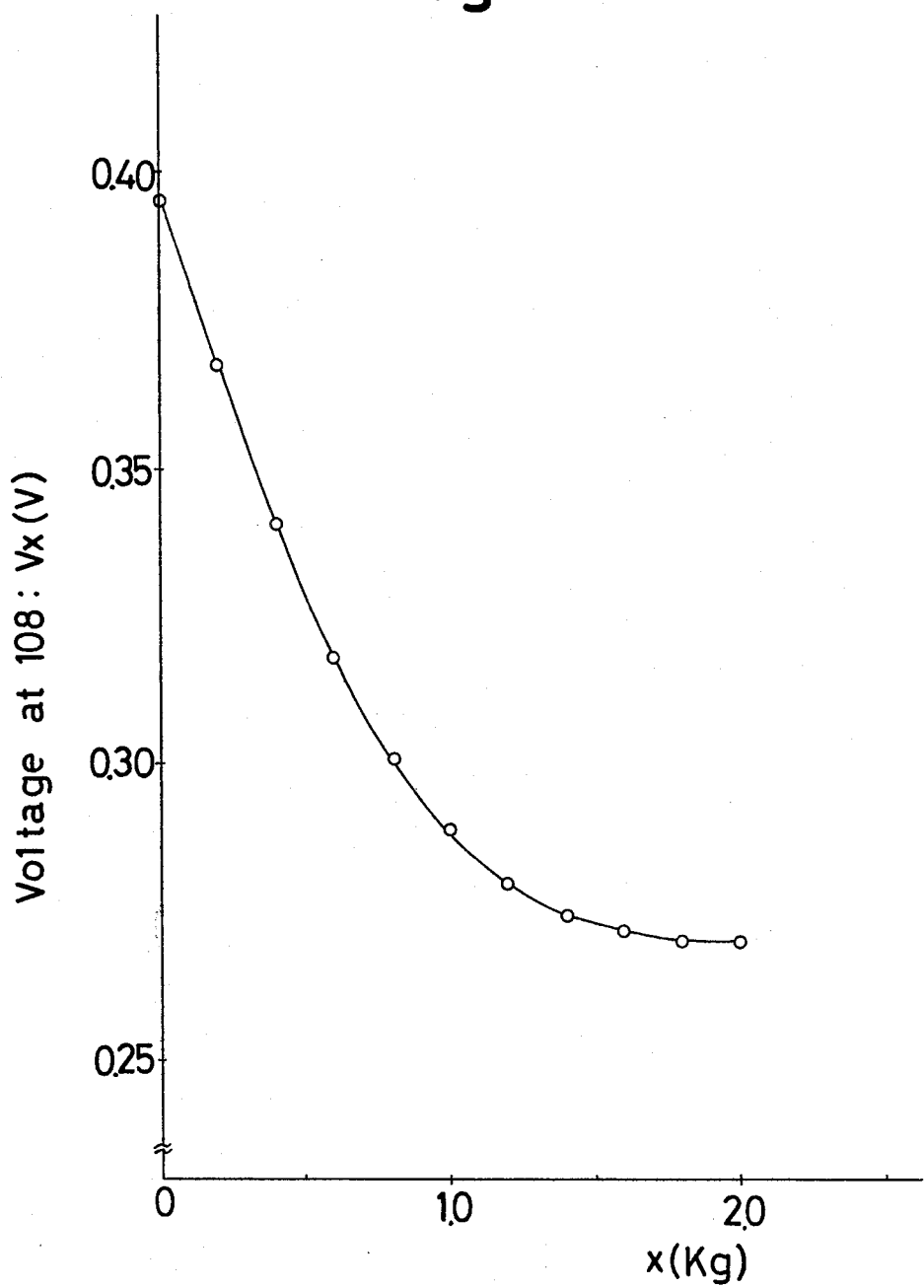

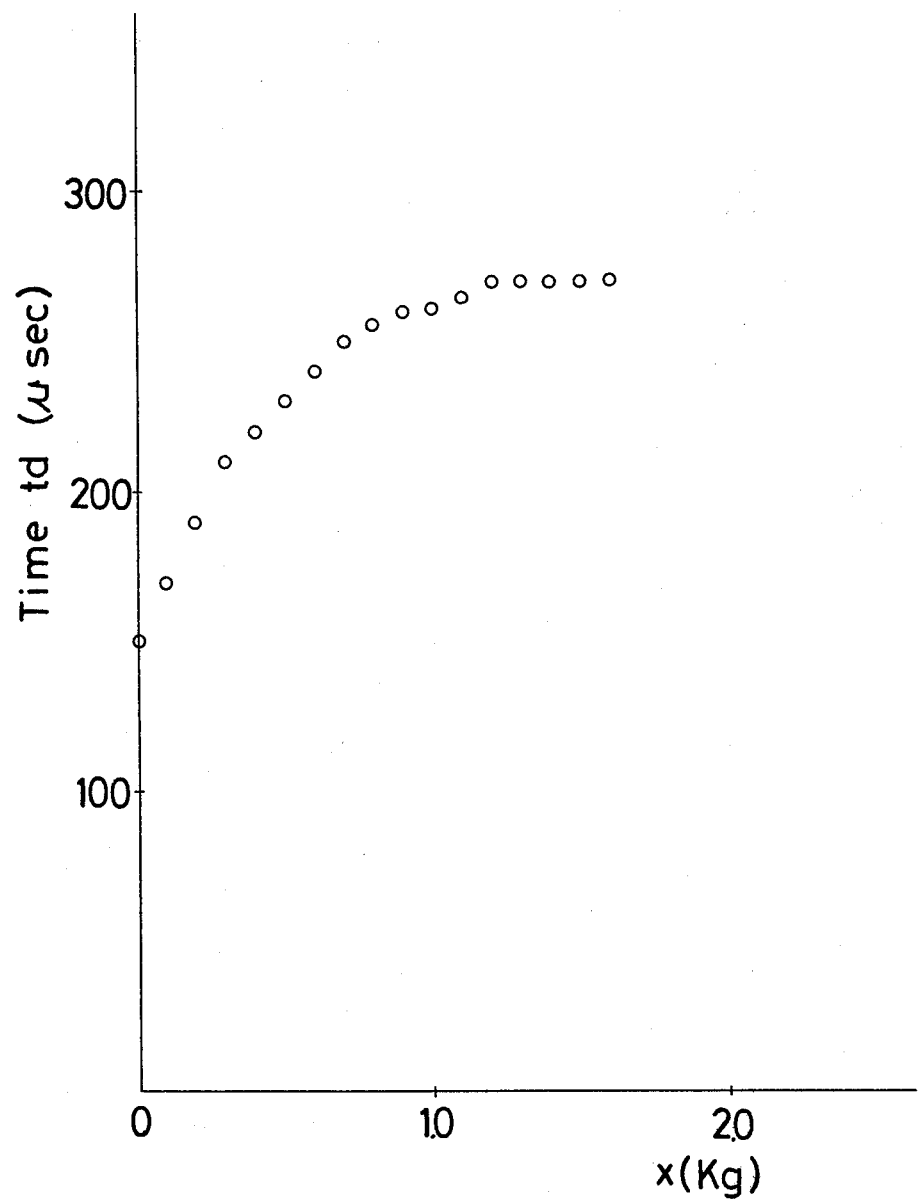

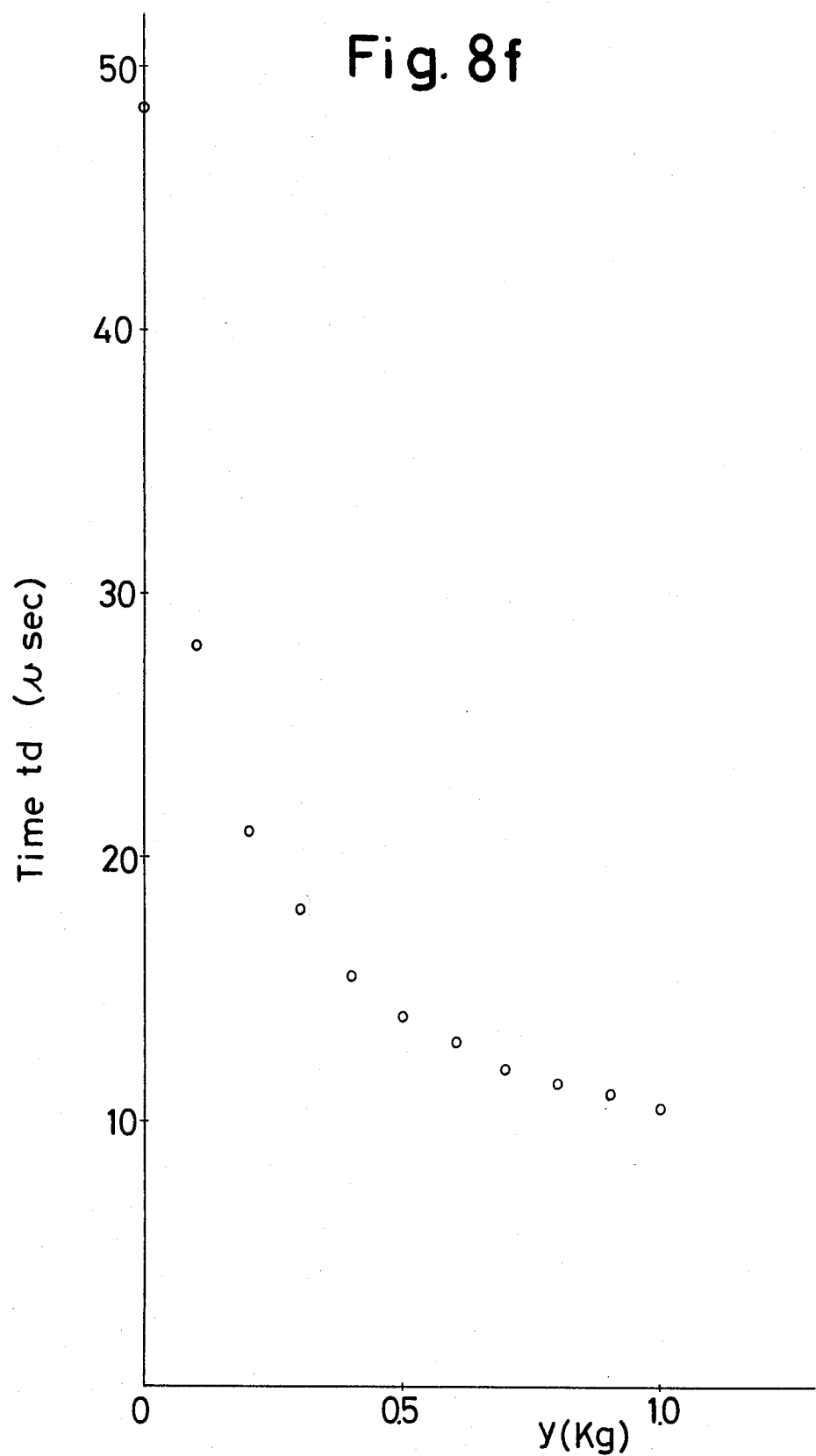

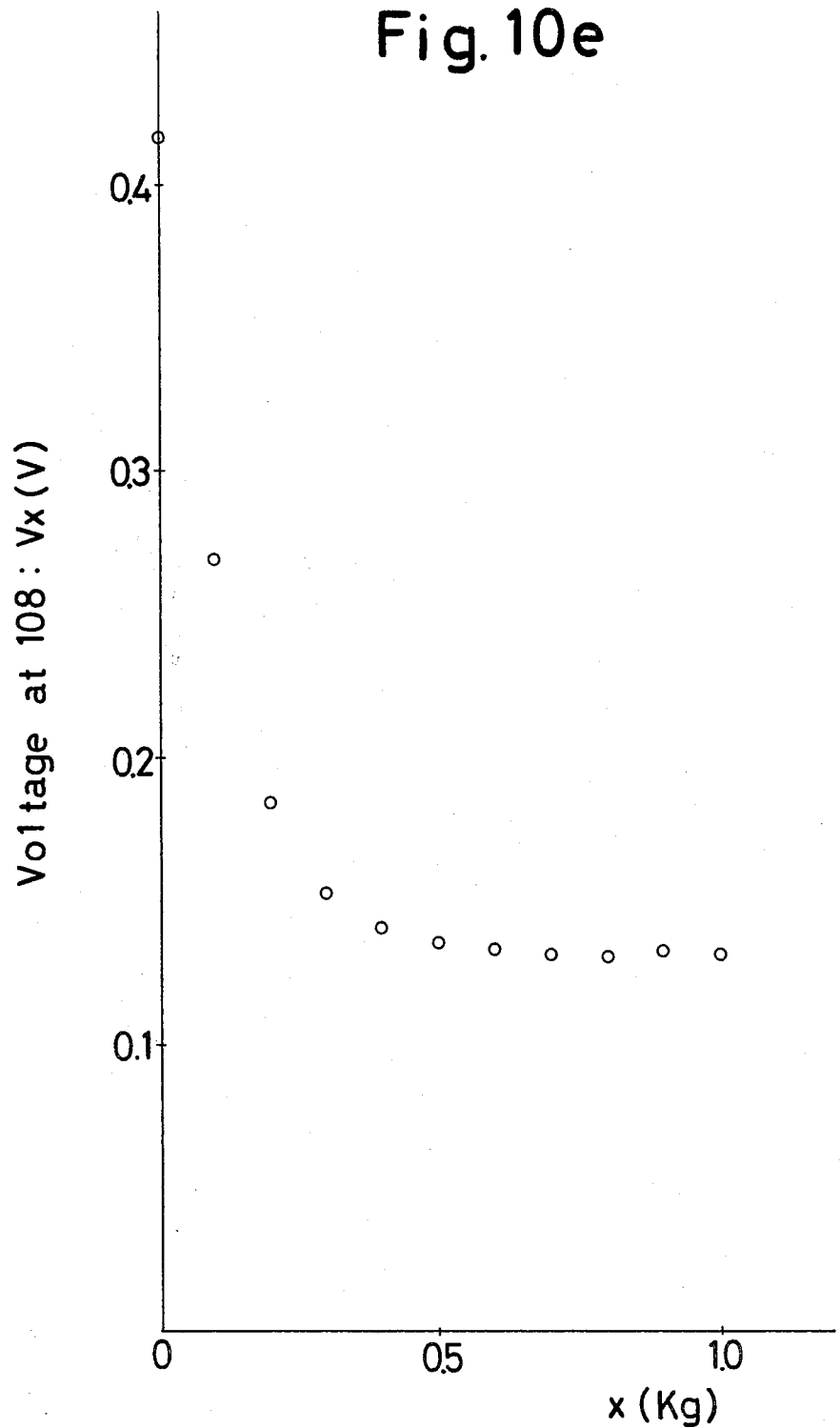

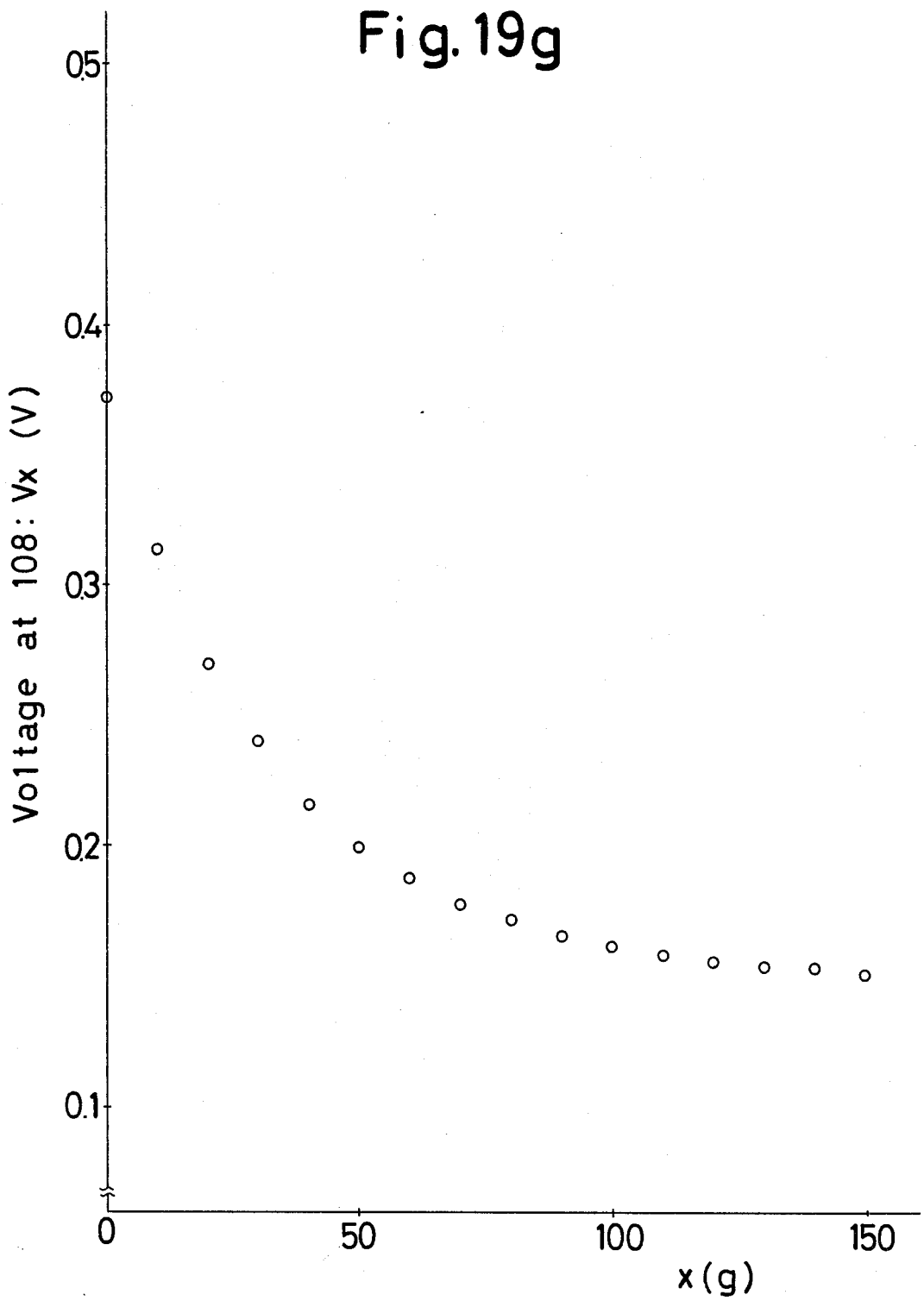

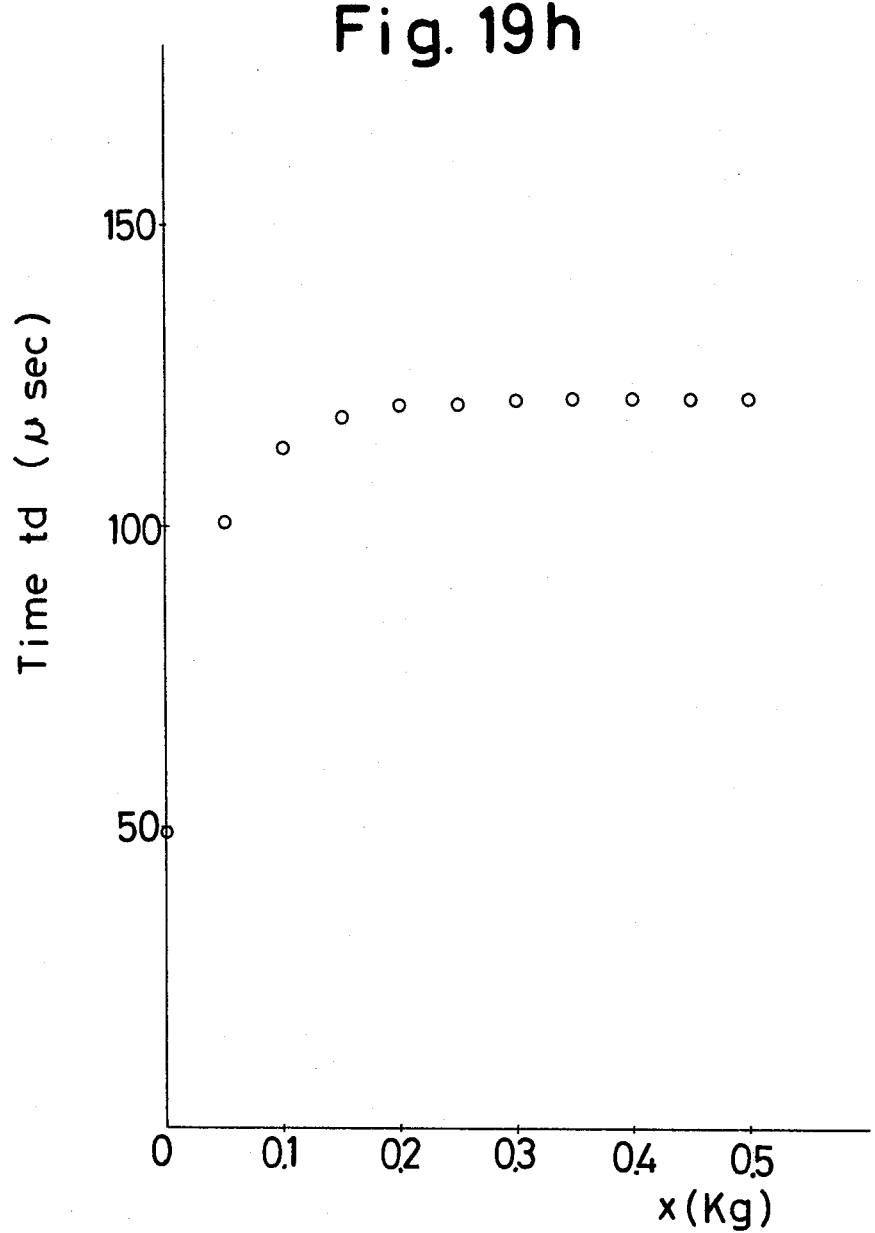

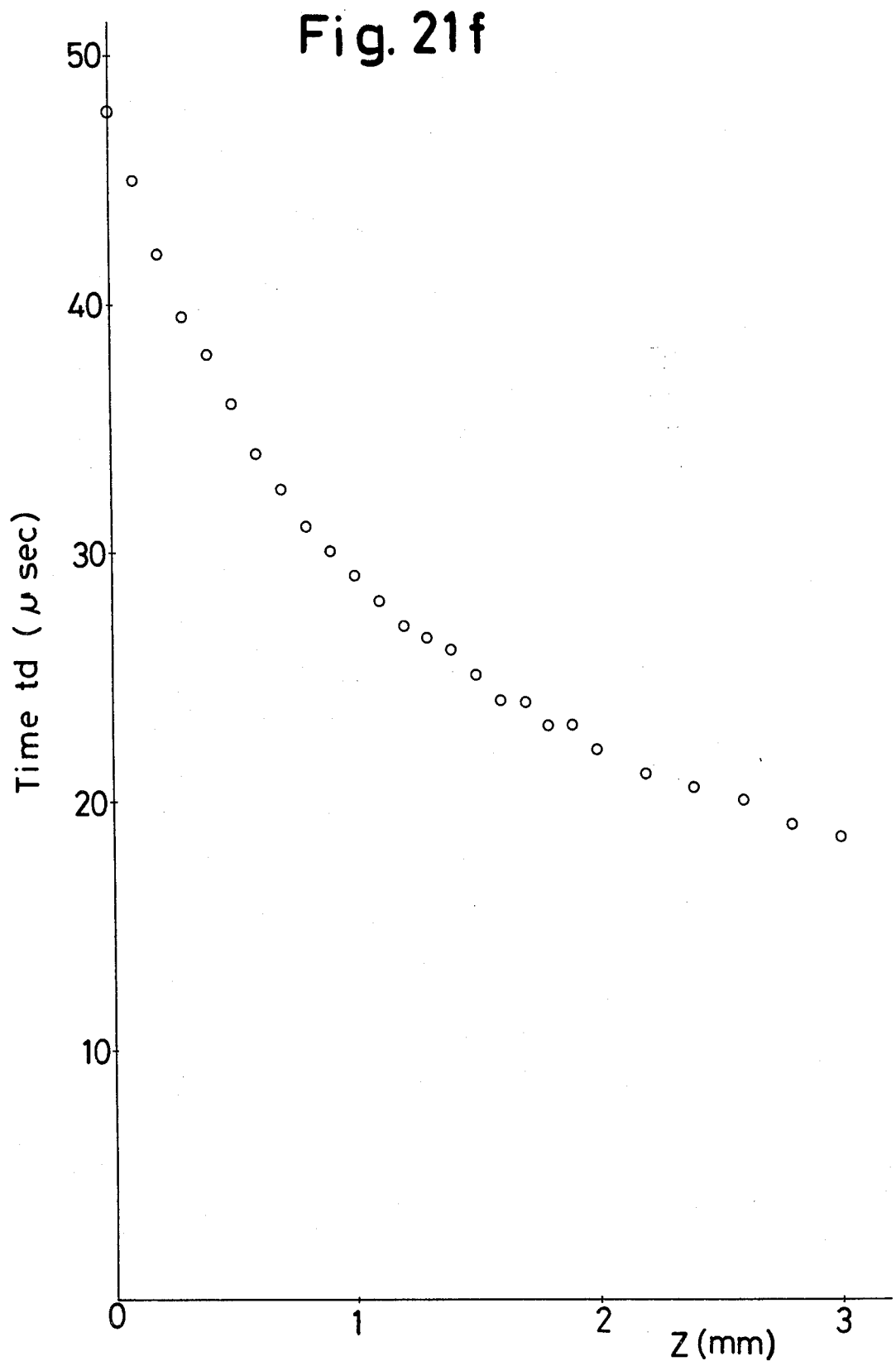

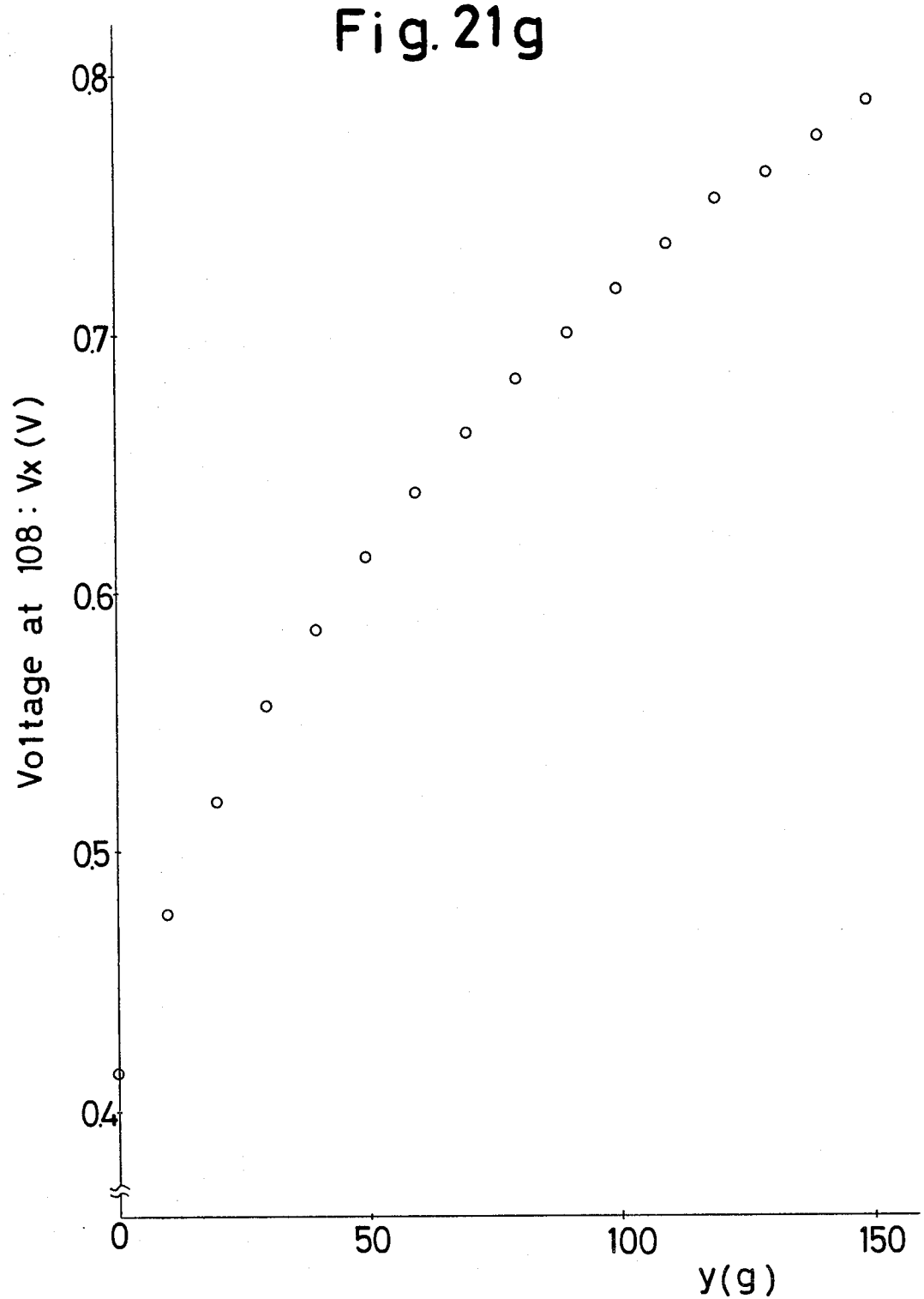

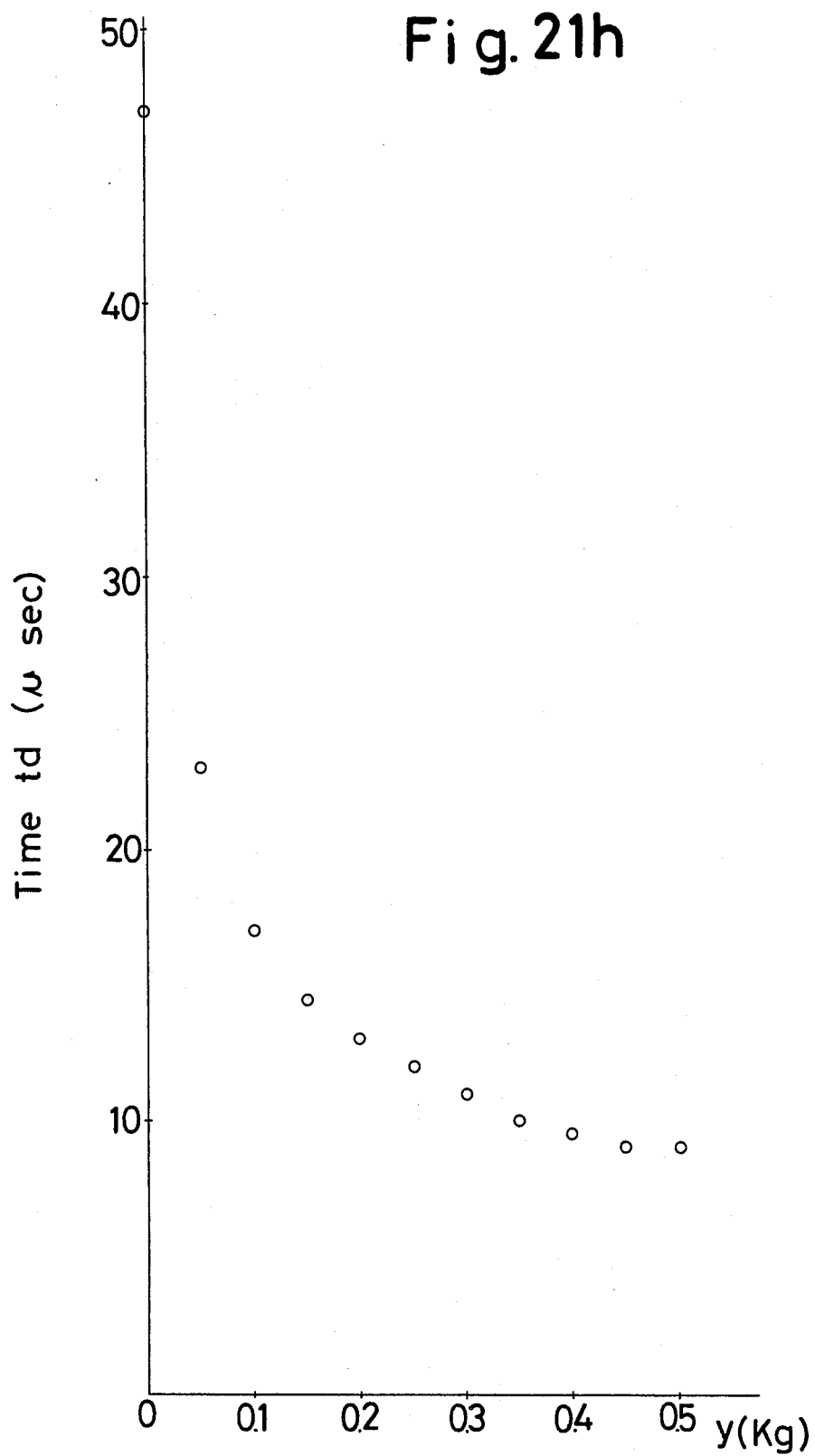

PRESSURE SENSOR

BACKGROUND OF THE INVENTION

1. Field of the Invention

This invention relates to a pressure sensor for converting a fluid pressure into an electrical signal, in particular, to a pressure sensor of the type in which a hydraulic pressure is applied to a movable body which is effective to convert a change in the stress produced in a member of an amorphous, magnetically soft metal material into an electrical signal.

2. Description of the Prior Art

One conventional pressure sensor includes a semiconductor strain gauge constructed so that a change in the gauge resistance which occurs in response to a pressure applied thereto is converted into an analog voltage, thus producing a pressure detecting signal. In this arrangement, the change in the resistance which occurs in accordance with the pressure is minimal, requiring a complex circuit arrangement to prevent adverse noise influences. In addition, the semiconductor is greatly influenced by temperature drift, and the useable temperature range is limited approximately from minus 30° C. to plus 100° C.

SUMMARY OF THE INVENTION

Accordingly, one object of this invention is to provide a novel pressure sensor which requires only a relatively simple electrical processing of a pressure detection signal.

Another object of this invention is to provide a novel pressure sensor which is less susceptible to temperature influences and which is characterized by high mechanical strength and stability and improved durability.

Yet another object of this invention is to provide a novel pressure sensor by which pressure data can be read-out by means of a relatively simple read-out logic implemented in an LSI element such as a conventional microcomputer.

These and other objects are achieved according to the invention by providing a novel pressure sensor including a casing defining an internal space divided by a movable body into a first space into which a fluid, the pressure of which is to be determined, is introduced, and a second space in which a fluid, usually air, of a given pressure, usually atmospheric pressure, is confined or passes. A member of an amorphous, magnetically soft metal material having an electrical coil disposed thereon is disposed in one of the spaces and is connected to the movable body to produce a stress therein in accordance with the load pressure applied by the movable body. The electrical coil has a sufficient number of turns so that the magnetically soft member can be magnetically saturated with a relatively low voltage applied or at a relatively low current level. When a voltage is applied to the coil disposed on the member, a current flow through the coil reaches a given level after a time interval T, measured from the time of application of the voltage, which is represented as follows:

$$T = \frac{N}{E} \phi \quad (1)$$

where

E: voltage applied to the coil

N: the number of turns of the coil $\phi$: a flux change from the remanent flux density to a flux density corresponding to the magnetic field which is produced by the current of the given level.

It will be noted that the value of $\phi$ is directly proportional to the magnitude of the magnetic permeability of the member. When a tensile stress is produced in the member, the magnitude of the permeability increases in a manner corresponding to the magnitude of the tensile stress, and hence the value of $\phi$ increases correspondingly. On the contrary, when a compressive stress is produced, the magnitude of the permeability of the member decreases depending on the magnitude of the compressive stress, as is the value of $\phi$. Accordingly, it will be understood that the time interval T from the application of the voltage to the coil until the coil current reaches the given level varies with the stress produced in the member, increasing for a tensile stress and decreasing for a compressive stress. Therefore, in the pressure sensor of the invention, the value of T is determined, and an electrical circuit or a semiconductor, electronic device is provided which produces an electrical signal indicative of the time interval in the form of a voltage level or digital code.

A magnetically soft material exhibits high permeability ($\mu_{max} > 10^3$) and low coercive force ($<1.0$ Oe). Some magnetically soft materials are described in Hasegawa et al, "Soft Magnetic Properties of Metallic Glasses—Recent Developments", J. Appl.Phys. 50(3), March, 1979, pp. 1551-1556, and magnetically soft materials are sold under the trademark METGLAS ™ by Allied Chemical Corp.

In the pressure sensor of the invention, the amorphous, magnetically soft metal material is shaped into a thin sheet since it must be quenched from liquid metal. As noted above, it exhibits a ferromagnetism and a high magnetic permeability and a high magnetic saturation as well as a low coercive force. Mechanically, it has a very high fracture strength and an excellent resiliency and stability. A change in the response thereof which occurs with temperature changes is greatly reduced as compared with that of a semiconductor.

These characteristics of a member formed of an amorphous, magnetically soft metal material are very advantageous for use in the pressure sensor of the invention. The use of such a member facilitates signal processing, and provides high accuracy in the electrical determination of the time interval T. In its mechanical aspects, such a member facilitates the manufacture of the sensor and improves its durability, rendering it less sensitive to the influence of temperature changes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a group which illustrates the waveforms of input and output signals of the electrical processing circuit shown in FIG. 2a;

FIG. 3b is a graph which illustrates input and output signals of the electrical processing circuit shown in FIG. 3a;

FIG. 6c is a graph which illustrates data indicative of the indicating voltage $V_x$ with respect to the tensile load x which is obtained utilizing the dimensions and the layout shown in FIGS. 6a and 6b and using the electrical processing circuit shown in FIG. 2a which is connected to the electrical coil;

FIG. 6d is a group which illustrates data indicative of the time delay $t_d$ with respect to the tensile load x which is obtained utilizing the dimensions and the layout shown in FIGS. 6a and 6b and using the electrical processing circuit shown in FIG. 3a which is connected to the electrical coil;

FIG. 8f is a graph which illustrates data indicative of the time delay $t_d$ with respect to the compressive load y which is obtained by utilizing the dimensions and the layout shown in FIGS. 8a to 8d and utilizing the electrical processing circuit shown in FIG. 3a which is connected to the electrical coil;

FIG. 10e is a graph which illustrates data representative of the indicating voltage $V_x$ with respect to the tensile load x which is obtained by utilizing the dimensions and the layout illustrated in FIGS. 10a to 10d and by utilizing the electrical processing circuit shown in FIG. 2a which is connected to the electrical coil;

FIG. 19g is a graph which illustrates data representing the indicating voltage $V_x$ with respect to the tensile load x which is obtained by utilizing the dimensions and the layout shown in FIGS. 19a to 19d and by utilizing the electrical processing circuit shown in FIG. 2a which is connected to the electrical coil;

FIG. 19h is a graph which shows data indicative of the time delay $t_d$ with respect to the tensile load x which is obtained by utilizing the dimensions and the layout shown in FIGS. 19a to 19d and by utilizing the electrical processing circuit shown in FIG. 3a which is connected to the electrical coil;

FIG. 21f is a graph which illustrates data indicative of the time delay $t_d$ with respect to the deflection which is obtained by utilizing the dimensions and the layout shown in FIGS. 21a to 21d and by utilizing the electrical processing circuit shown in FIG. 3a which is connected to the electrical coil;

FIG. 21g is a graph which shows data representing the indicating voltage $V_x$ with respect to the compressive load y which is obtained by utilizing the dimensions and the layout shown in FIGS. 21a to 21d and by utilizing the electrical processing circuit shown in FIG. 2a which is connected to the electrical coil;

FIG. 21h is a graph which illustrates data indicative of the time delay $t_d$ with respect to the compressive load y which is obtained by utilizing the dimensions and the layout shown in FIGS. 21a to 21d and by utilizing the electrical processing circuit shown in FIG. 3a which is connected to the electrical coil;

DESCRIPTION OF THE PREFERRED EMBODIMENTS

Figure 1:
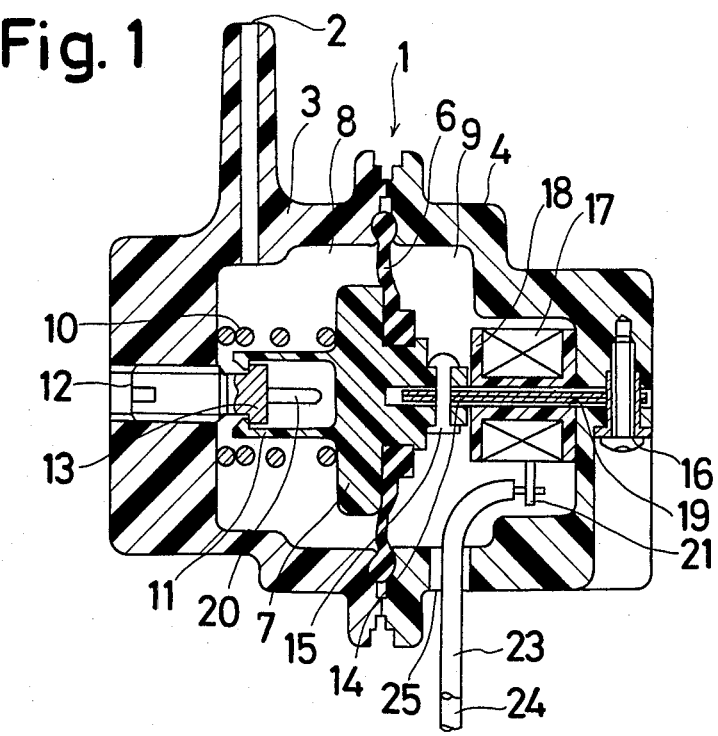
FIG. 1 is a longitudinal cross-sectional view of a pressure sensor according to a first embodiment of the invention.

Referring now to the drawings, wherein like reference numerals designate identical or corresponding parts throughout the several views, and more particularly to FIGS. 1–6d thereof, which illustrate the principles of the first embodiment of the pressure sensor 1 according to the invention, the pressure sensor 1 is seen to include a first body 3 formed of resin material and having an inlet 2 into which a negative pressure prevailing in the intake manifold of an engine mounted on a vehicle is introduced, and a second body 4 also formed of resin material and joined to the body 3 by ultrasonic welding. A diaphragm 6 has its periphery held between the first and the second bodies 3, 4 and includes a central flat portion, through which a piston 7 extends and is secured thereto. The combination of the diaphragm 6 and the piston 7 divides the internal space defined by the first and the second bodies 3, 4 into a first inner space 8 communicating with the inlet 2 and a second inner space 9 communicating with the atmosphere. The piston 7 is normally urged by a coiled compression spring 10, disposed within the first inner space 8, in a direction to reduce the second inner space 9 or to the right, as viewed in FIG. 1. Hence, when the atmospheric pressure prevails in the first space 8, a hook portion 11 formed on the free end of a tubular extension from the back of the piston 7 bears against a flange 13 formed on the shank of a screw 12 which is threadably engaged with the first body 3 (see FIG. 1). It will be appreciated that the screw 12 can move toward or away from the diaphragm 6 as it is turned. This means that a movement of the piston 7 to the right is constrained at a location by the screw 12, which point is adjusted by turning the screw 12. Secured to the right-hand end of the piston 7 is one longitudinal end of a core 14 in the form of a plate of an amorphous, magnetically soft metal material, by means of a rivet 15. The other end of the core 14 is secured to the body 4 by a bolt 16.

Under the conditions shown in FIG. 1 where the atmospheric pressure prevails in the first inner space 8, the screw 12 is adjusted so that the hook-shaped projection 11 engages the flange 13, whereby the piston 7 causes no stress to be produced in the core 14. A bobbin 18 having an electrical coil 17 disposed on its peripheral surface is secured to the body 4, and includes an internal bore 19 into which the core 14 extends. The right-hand end of the flange 13 is formed with a stop 20, which limits a displacement of the piston 7 to the left. The opposite ends of the coil 17 are connected to a pair of terminals 21, 22 (not shown in FIG. 1) for connection with a pair of lead wires 23, 24. A numeral 25 indicates an opening for admitting atmospheric air into the second inner space 9. When a negative pressure is applied to the first inner space 8 through the inlet 2, it acts on the diaphragm 6 and the piston 7, which move, against the resilience of the spring 10, in a direction to reduce the first inner space 8, namely, to the left. As a result of the loading by the piston 7, a tensile stress is produced in the core 14 which is directed to the left, as viewed in FIG. 1. The tensile stress produced in the core 14 is detected by an electrical processing circuit or an electronic logical processing unit.

FIG. 2 shows one form of electrical processing circuit 100. The circuit 100 includes a terminal 101 adapted to be connected with a given d.c. supply voltage, Vcc, on the order of +5 V, for example. The circuit also includes an input terminal 102, to which a voltage pulse having a frequency on the order of 5–25 kHz, for example, is applied. An NPN transistor 103 which has its base connected to the terminal 102 is rendered conductive during the time the pulse voltage remains positive, and is rendered non-conductive when the pulse voltage assumes a ground level. A PNP transistor 104 is turned on and off when the transistor 103 is turned on and off respectively. Hence, the supply voltage (Vcc) is applied to the electrical coil 17 during the time the voltage pulse applied to the input terminal 102 remains positive, while no voltage is applied thereto during the time the pulse voltage remains at the ground level. A voltage proportional to current flowing through the coil 22 is developed across a resistor 105, and is integrated by an integrator formed by a resistor 106 and a capacitor 107, with the integrated voltage appearing at an output terminal 108.

Figure 2A:
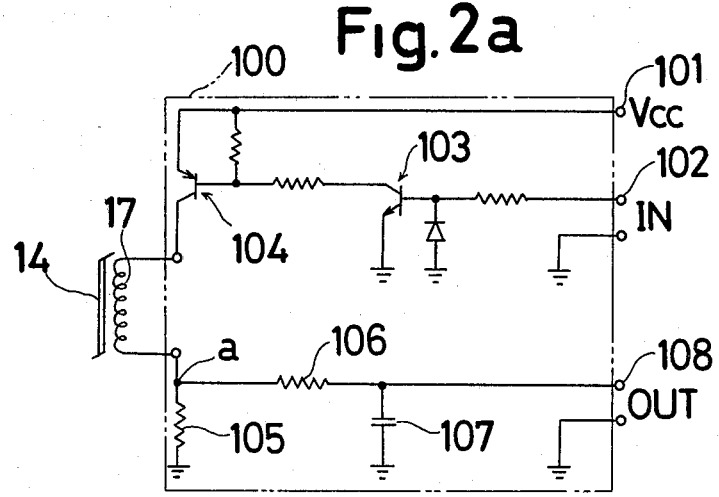
FIG. 2a is a circuit diagram of an electrical processing circuit which is connected to the electrical coil of the pressure sensor shown in FIG. 1 to produce an analog voltage of a level which depends on the pressure detected.
Figure 2B:
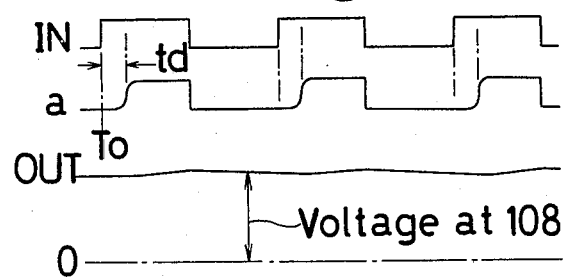

FIG. 2b graphically shows the waveform of the input and the output voltage of the circuit shown in FIG. 2a. The time lag $t_d$ from the rising end of the input voltage (IN) until the voltage across the resistor 105 exceeds a given level, as well as the integrated voltage $V_x$, which represents an integral of the voltage across the resistor 105, both depend on the magnitude of the stress produced in the core 14 of the amorphous magnetically soft core material.

Figure 3A:
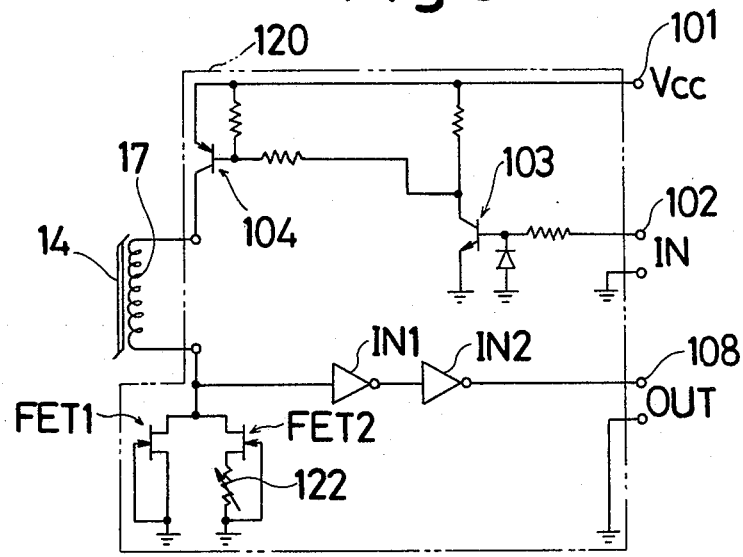
FIG. 3a is a circuit diagram of another electrical processing circuit connected to the electrical coil of the pressure sensor shown in FIG. 1 to produce a delayed pulse having a time delay which corresponds to the pressure detected.

FIG. 3a illustrates another electrical processing circuit 120. In this instance, NPN transistor 103 is turned off while PNP transistor 104 is turned off during the time when the input voltage (IN) remains grounded, thus inhibiting the application of any voltage to the coil 17. During the time the input voltage (IN) assumes the positive level, the transistor 103 is turned on, while the PNP transistor 104 is turned on. A pair of junction N-channel field effect transistors FET 1 and FET 2 forms a constant current source and maintain a constant current flow through the coil. The current level through FET 2 can be adjusted by means of a variable resistor 122. The voltage developed at the terminal of the coil which is connected to FET 1 and FET 2 is fed to a pair of cascade connected inverting amplifiers IN1 and IN2, which amplify and shape this voltage.

Figure 3B:
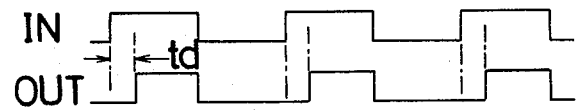

FIG. 3b graphically shows the waveforms of input and output voltages of the circuit of FIG. 3a. The circuit 120 produces an output (OUT) which is a voltage pulse which is delayed by a time lag $t_d$ with respect to an input pulse (IN), and the magnitude of time lag depends on the magnitude of the stress produced in the core 14 of the amorphous magnetically soft core material.

Figure 4:
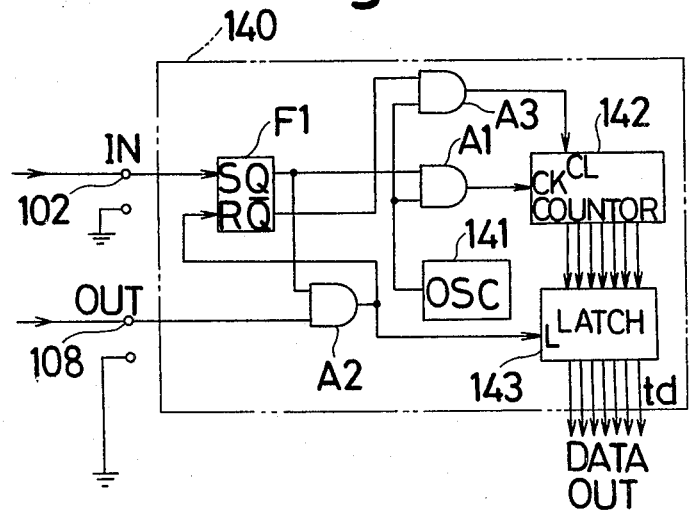
FIG. 4 is a block diagram of a counter circuit which converts the time delay between the input and the output pulses of the electrical processing circuit shown in FIG. 3a into a digital code.

FIG. 4 shows a counter circuit 140 which converts the magnitude of $t_d$ into a corresponding digital code. In the circuit of FIG. 4, the leading edge of an input voltage (IN) sets a flipflop F1, whereby its Q output changes to a high level or "1", which enables an AND gate A1 to pass a pulse produced by a clock pulse oscillator 141 to a count pulse input CK of a counter 142. An output pulse (OUT) and the Q output of the flipflop F1 are applied to an AND gate A2, which produces a high level or "1" when the output pulse (OUT) rises to a high level. At this point in time, the flipflop F1 is reset, with its Q output reverting to a low level or "0". This disables the AND gate A1, and hence the supply of clock pulses to the counter 142 is interrupted. At the time when the AND gate A2 produces a "1" output, a code indicative of the count in the counter 142 is stored in a latch 143. After the flipflop F1 is reset and the latch 143 has been loaded with th count code, an AND gate A3 passes a clock pulse to clear the counter 142. An output code from the latch 143 indicates the number of clock pulses passed during the time interval of $t_d$, and hence represents the magnitude of $t_d$.

Figure 5:
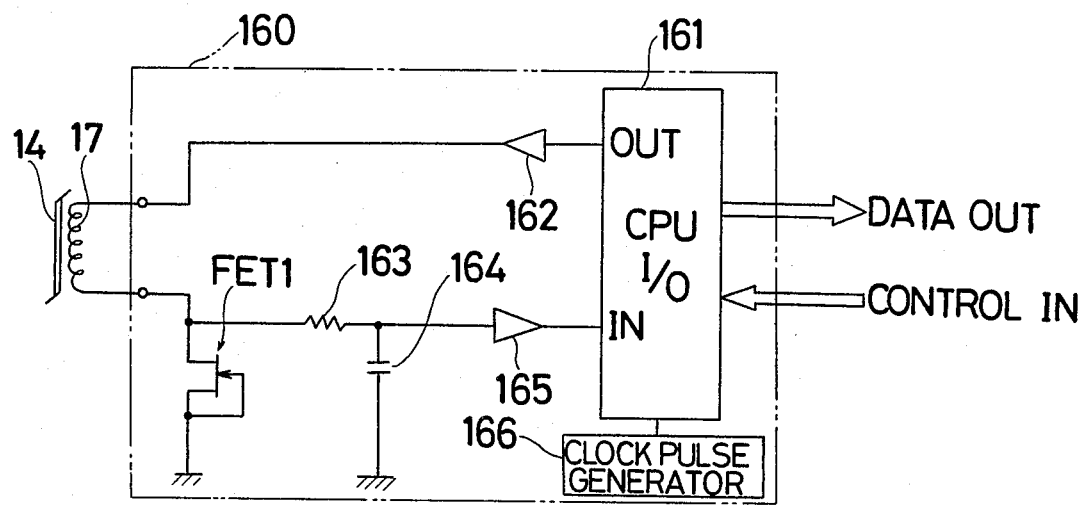
FIG. 5 is a block diagram of an electronic processing unit including a single chip microcomputer connected to the electrical coil of the pressure sensor shown in FIG. 1, which digitally counts the time delay after application of an input voltage pulse until the rising of current flow through the electrical coil.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse oscillator 166. The combination of the resistor 163 and the capacitor 164 forms a filter which removes voltage oscillations of higher frequencies than the frequency of the input and the output pulses. The microcomputer 161 forms pulses of a given frequency in a range from 5 to 30 kHz in response to the clock pulse, and feeds it to the amplifier 162. On the other hand, the microcomputer 161 monitors the voltage developed at the junction between the N-channel FET 1 and one end of the coil 17, or the output voltage of the amplifier 165, and counts the clock pulses which are developed during the time from the leading edge of the pulse outputted by itself until the output voltage of the amplifier 165 rises to a given level. Such time interval corresponds to $t_d$, and the microcomputer forms an output code indicative of the value of $t_d$ (DATA OUT).

As discussed above, the pressure sensor 1 shown in FIG. 1 can be connected with a variety of electrical processing circuits or an electronic logical processing unit to derive an electrical signal which corresponds to the stress produced in the core 14 of the amorphous material of the pressure sensor 1. The manner of deriving an electrical signal corresponding to a negative hydraulic pressure, by utilizing the pressure sensor 1 of FIG. 1 in combination with the electrical processing circuits 100, 120, 140 or the logical processing unit 160 will now be described.

Figure 6A:
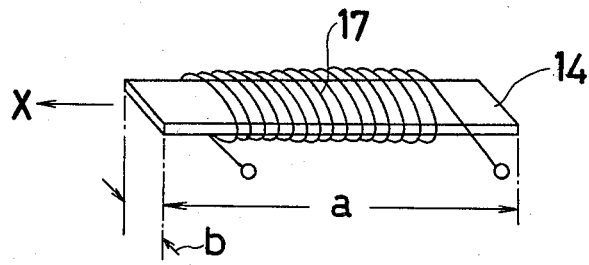
FIG. 6a is a perspective view of a member of an amorphous, magnetically soft metal material, indicating various dimensions which are utilized in an experiment to determine a load indicating voltage $V_x$ and a pulse time delay $t_d$ which are obtained when the member is subjected to a lengthwise tensile load.
Figure 6B:
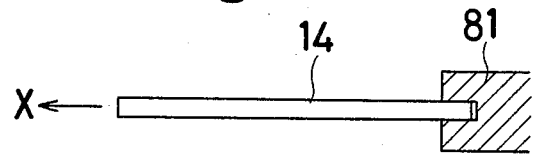
FIG. 6b is a front view of an experimental layout for applying a tensile load on the member lengthwise or in the direction of X axis, with the electrical coil being omitted from the illustration.

Initially, the combination of the diaphragm 6, the piston 7 and the spring 10 of the pressure sensor 1 converts a negative hydraulic pressure which prevails at the inlet 2 into a stress produced in the core 14 of the amorphous material. The conversion of the tensile stress produced in the core into an electrical signal will be described in terms of experimental data illustrated in FIGS. 6c and 6d. By securing the right-hand end of the core 14 to a vise 81 and utilizing a push-pull gauge (not shown) to apply a tensile load to the left along the longitudinal axis thereof or in the X-direction, as indicated in FIGS. 6a and 6b, the inventor has determined the values of $V_x$ and $t_d$ with respect to the tensile load x applied to the core 14. The dimensions a and b and the amorphous material used in Cases No. 1 and 2 are indicated in the Table 1 below in a manner corresponding to the resulting data.

TABLE I

| Case No. | Amorphous Magnetically Soft Member 14 | | | | | Measuring means and frequency of input pulse | Data |
|---|---|---|---|---|---|---|---|
| | Material, Atomic Weight Percent | Thickness mm | a mm | b mm | Number of Sheets | Number of Turns | | |
| 1 | $Fe_{81}B_{13.5}Si_{5.5}$ | 0.058 | 55 | 10.0 | 1 | 1000 | Circuit 100 5 kHz | FIG. 6c |
| 2 | " | " | " | " | " | " | Circuit 120 & Synchrosocpe 100 Hz | FIG. 6d |

In Case No. 1, it will be seen from the data shown in FIG. 6c that the voltage $V_x$ with a high accuracy can be obtained for a tensile load x of from zero to 0.8 kg. In Case No. 2, the data of FIG. 6d indicates that an increased change in the time delay $t_d$ can be obtained with a high linearity for individual broad ranges of 0–0.3 kg and 0.3–0.8 kg.

Figure 7:
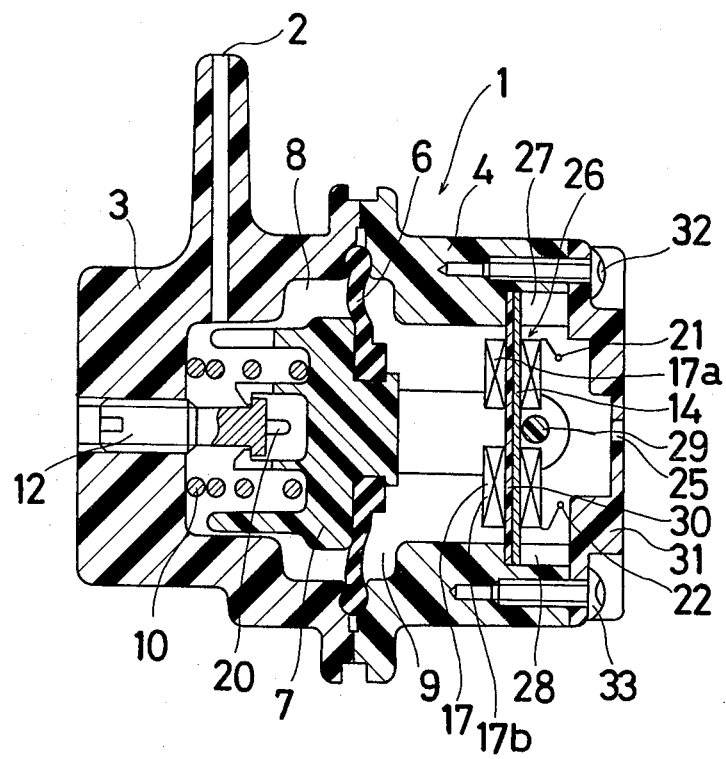
FIG. 7 is a longitudinal cross-sectional view of a pressure sensor according to a second embodiment of the invention.

Second Embodiment (FIGS. 7 and 8)

In the pressure sensor 1 shown in FIG. 7, the right-hand end of the body 4 is open and is formed with a pair of grooves 27, 28 which are capable of supporting both longitudinal ends of a core 26. When the atmospheric pressure prevails in the first inner space 8, no stress is produced in the core 26 as a result of an adjustment of the screw 12 such that a pin 29 formed on the right-hand end of the piston 7 bears against the central portion of the core 26 on its right-hand side to displace it to the left-hand side of the grooves 27, 28 as shown in FIG. 7, without applying any load on the core 26.

The core 26 comprises an amorphous, magnetically soft metal material 14 which is integrally joined, as by epoxy adhesive (not shown), for example, with an elastic member 30 of epoxy resin, vinyl chloride resin or beryllium copper, for example. A vinyl tape (not shown) is wrapped around the surface of the core 16, and a coil 17 comprising a series combination of a pair of coil portions 17a, 17b having the same direction of winding is disposed thereon. The right-hand open end of the body 4 is closed by a cover 31 having an opening 25 for communication with the atmosphere and which is secured in place by bolts 32, 33. When a negative pressure is introduced into the first inner space 8 through the inlet 2, the diaphragm 6 and the piston 7 are displaced in a direction to reduce the first inner space 8 or to the left, against the resilience of the spring 10 and in accordance with the magnitude of the negative pressure. The displacement of the piston 7 causes the pin 19 to apply a load on the central portion of the core 26, which is therefore flexed to the left. In this manner, a compressive stress is produced in the entire amorphous material 14 which is integrally joined with the elastic member 30. The pressure sensor 1 shown in FIG. 7 may be used in the same manner as the pressure sensor shown in FIG. 1 to derive an electrical signal corresponding to the negative hydraulic pressure, by combination with one of the electrical processing circuits 100, 120, 140 and the logical processing unit 160. As before, the negative hydraulic pressure prevailing at the inlet 2 is converted into a compressive stress produced in the amorphous material 4 by the combination of the diaphragm 6, the piston 7 and the spring 10 of the pressure sensor 1. The compressive stress is then converted into a corresponding electrical signal, and such conversion will be described below with reference to the experimental data illustrated in FIGS. 8e and 8f.

Figure 8A:
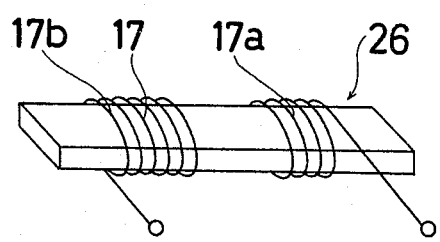
FIG. 8a is a perspective view of the core used in the pressure sensor of FIG. 7, in which a load is applied to a central core portion lengthwise of the core, vertically from above to derive an indicating voltage $V_x$ and a pulse time delay $t_d$.
Figure 8B:
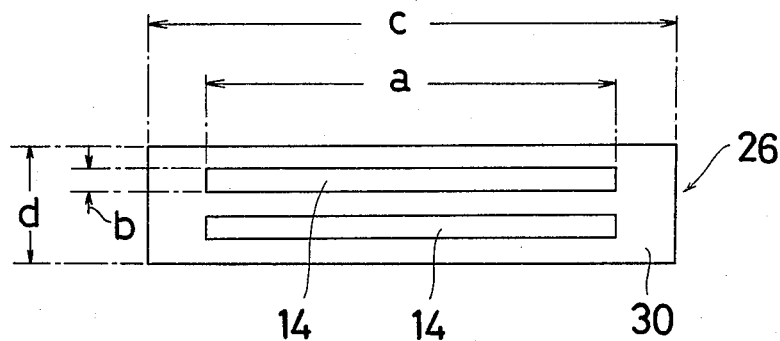
FIG. 8b is a plan view of the core of FIG. 8a, with the electrical coil omitted from illustration.
Figure 8C:
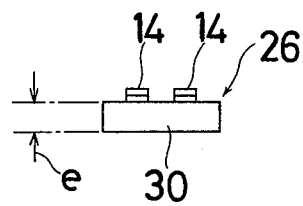
FIG. 8c is a right-hand side elevational view of the core shown in FIG. 8b.
Figure 8D:
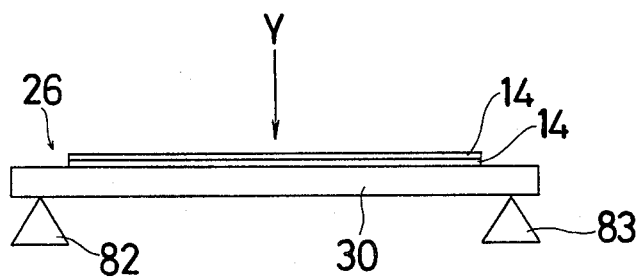
FIG. 8d is a front view of an experimental layout for applying a compressive load on the core of the amorphous magnetically soft member shown in FIGS. 8a to 8c, with the electrical coil omitted from illustration.

Utilizing an arrangement illustrated in FIGS. 8a to 8b, the inventor has determined the voltage $V_x$ and the time delay $t_d$ with respect to the compressive load in the amorphous material 14. Specifically, a pair of strips 14 of an amorphous, magnetically soft metal material are joined together in an integral manner by an epoxy adhesive. Two of such assemblies are integrally joined with a substrate 30 of an epoxy resin while maintaining a parallel relationship therebetween, thereby forming the core 26. The core 26 is placed on a pair of mounts 82, 83 with the strips 14 located on the top side of substrate 30. By utilizing a push-pull gauge which acts in the Y-direction, a load is applied to the central portion of the upper surface of the core 16, thereby producing a compressive load y in the strips 14. The dimensions a to e and the amorphous material used are indicated in the Table 2 below as Cases No. 3 and 4, together with the designation of Figures which indicate the data obtained.

TABLE 2

Figure 8E:
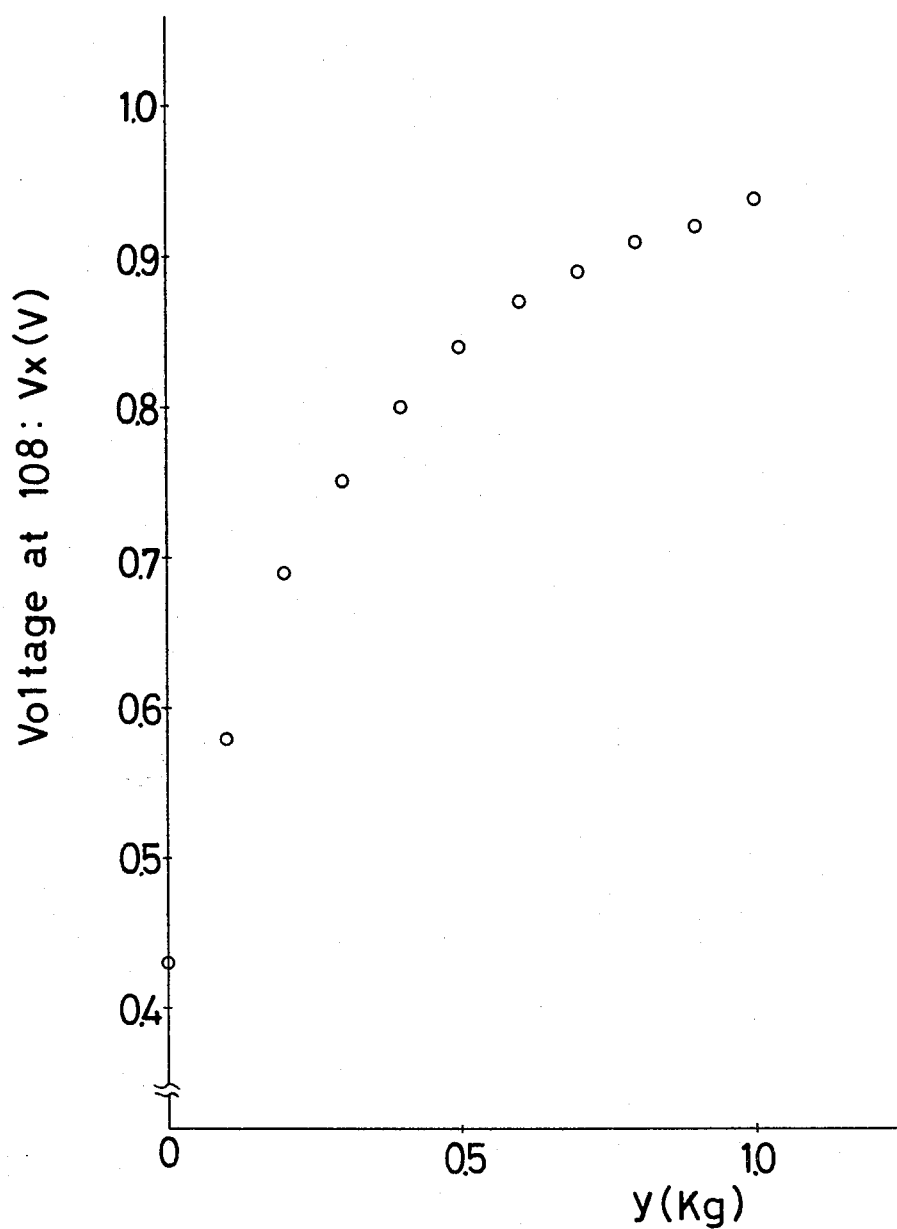
FIG. 8e is a graph which illustrates data representing the indicating voltage $V_x$ with respect to the compressive load y which is obtained utilizing the dimensions and the layout shown in FIGS. 8a to 8d and utilizing the electrical processing circuit shown in FIG. 2a which is connected to the electrical coil.
Figure 10A:
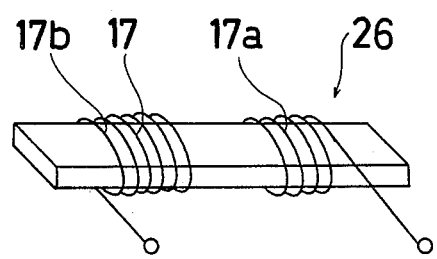
FIG. 10a is a perspective view of the core of the pressure sensor shown in FIG. 9, in which a load is applied to the central portion lengthwise of the core, vertically from above to derive an indicating voltage $V_x$ and a pulse delay time $t_d'$.
Figure 10B:
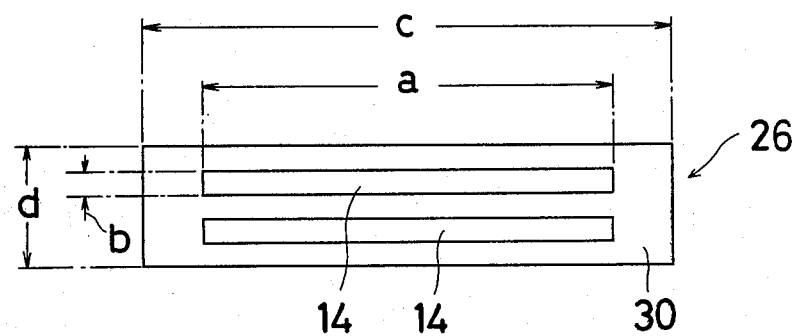
FIG. 10b is a bottom view of the core of FIG. 10a, with the electrical coil omitted from illustration.
Figure 10C:
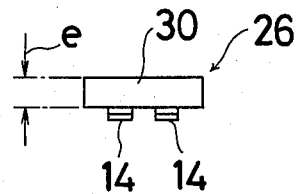
FIG. 10c is a right-hand side elevational view of the core shown in FIG. 10b.
Figure 10D:
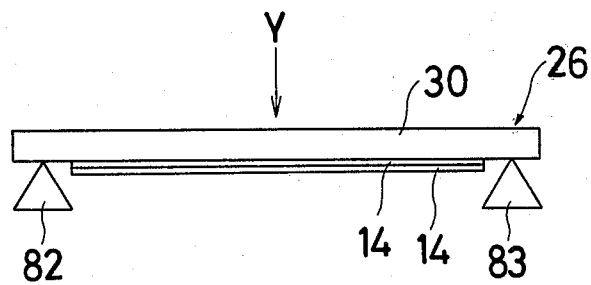
FIG. 10d is a front view of an experimental layout for applying a tensile load to the member of the amorphous material in the core of FIGS. 10a to 10c, with the electrical coil omitted from illustration.
Figure 10F:
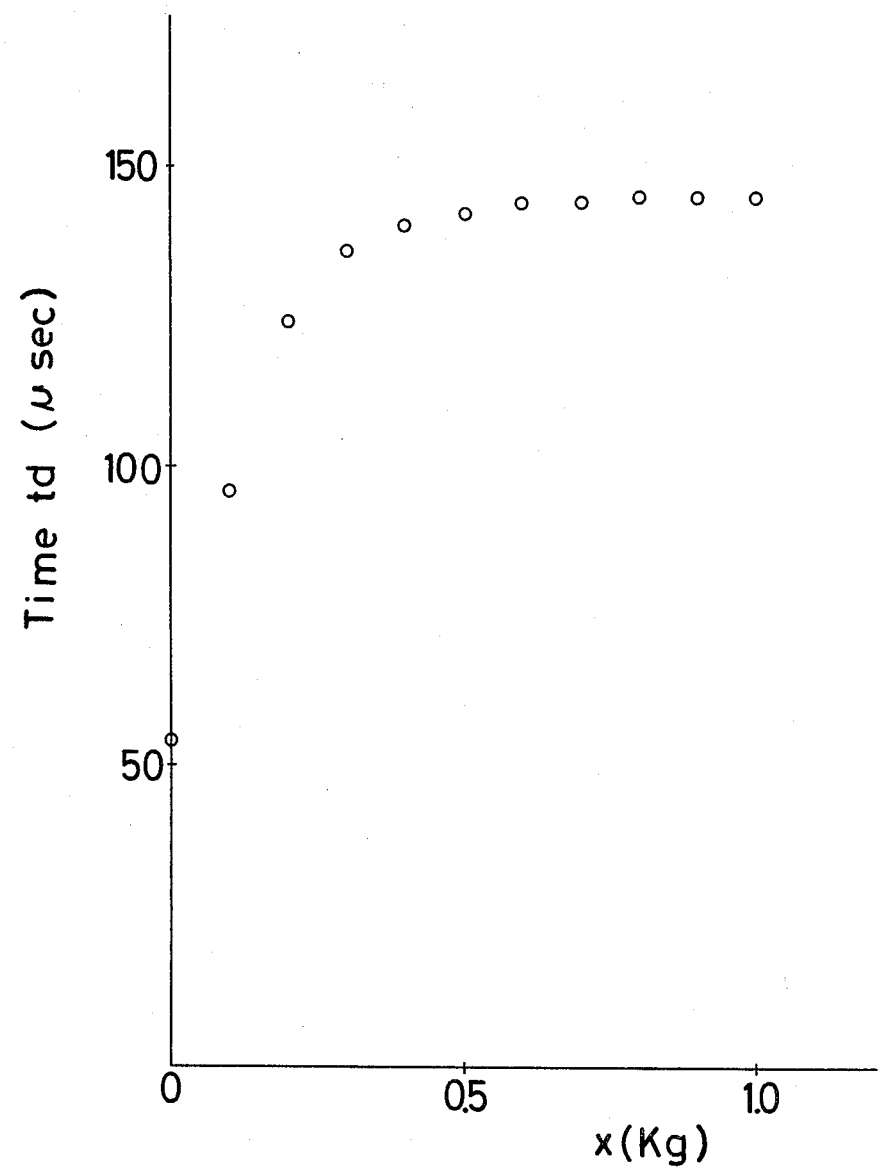
FIG. 10f is a graph which illustrates data indicative of the pulse time delay $t_d$ with respect to the tensile load y which is obtained by utilizing the dimensions and the layout illustrated in FIGS. 10a to 10d and by utilizing the electrical processing circuit shown in FIG. 3a which is connected to the electrical coil.

| Case No. | Amorphous Material 14 | | | | | Elastic Member 30 | | | Coil 17 | Measuring means and frequency of input pulse | Data |
|---|---|---|---|---|---|---|---|---|---|---|---|
| | Material, Atomic Weight Percent | Thickness mm | a (mm) | b (mm) | Number of Sheets | c (mm) | d (mm) | e (mm) | Number of Turns | | |
| 3 | $Fe_{40}Ni_{40}P_{14}B_6$ | 0.058 | 80 | 1.8 | 4 | 95 | 6 | 0.6 | 2000 | Circuit 100 5 kHz | FIG. 8e |
| 4 | " | " | " | " | " | " | " | " | " | Circuit 120 & Synchroscope 100 Hz | FIG. 8f |
| 5 | " | " | " | " | " | " | " | " | " | Circuit 100 5 kHz | FIG. 10e |
| 6 | " | " | " | " | " | " | " | " | " | Circuit 120 & Syncroscope 100 Hz | FIG. 10f |

In Case No. 3, the data shown in FIG. 8e indicates that a voltage $V_x$ having a high accuracy and exhibiting a large change is obtained for a compressive load y of zero to 0.7 kg. In Case No. 4, the data of FIG. 8f indicates that a time delay having a high linearity and exhibiting a large change is obtained for individual ranges of zero to 0.2 kg and 0.4 to 0.7 kg.

Figure 9:
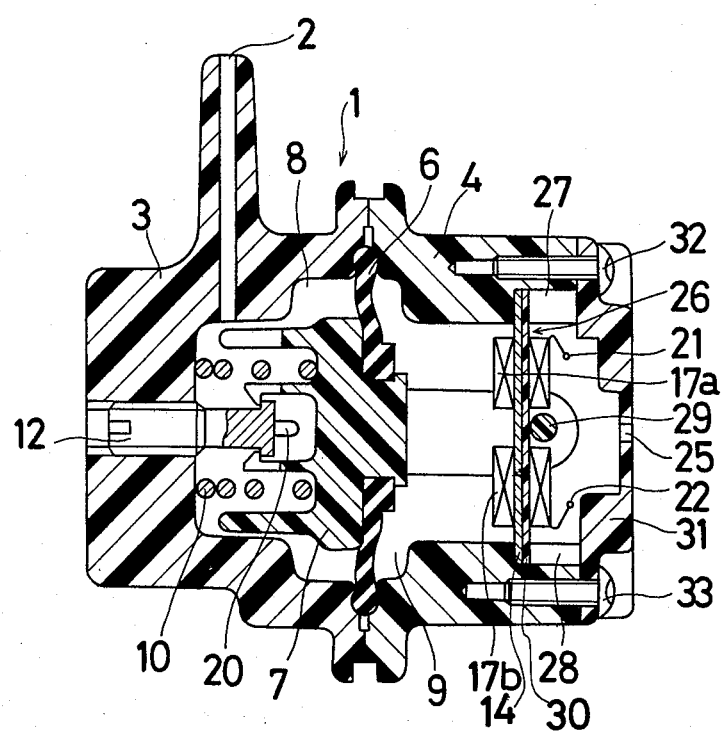
FIG. 9 is a longitudinal cross-sectional view of a pressure sensor according to a third embodiment of the invention.

Third Embodiment (FIGS. 9 and 10)

The pressure sensor 1 shown in FIG. 9 is similar to the pressure sensor shown in FIG. 7 in that the central portion of the core 26 is urged or driven as the pin 29 is displaced, but the elastic member 30 is disposed for abutment by the pin 29 and the amorphous material 14 is integrally joined to the opposite side thereof. When a negative pressure is introduced into the first inner space 8 through the inlet 2, the diaphragm 6 and the piston 7 are displaced against the resilience of the spring 10 in a direction to reduce the first inner space 8 or to the left in accordance with the magnitude of the negative pressure. The displacement of the piston 7 causes the pin 29 to apply a load on the central portion of the core 26, which therefore flexes to the left-hand side. In this manner, a tensile stress is produced in the entire amorphous material 14 which is integrally joined with the elastic member 30. The pressure sensor 1 shown in FIG. 9 may be utilized in the same manner as the pressure sensor of FIG. 1 by combination with one of the described electrical processing circuits 100, 120, 140 and the logical processing unit 160 to derive an electrical signal which corresponds to the negative hydraulic pressure.

The conversion begins by converting the negative hydraulic pressure which prevails at the inlet 2 into a tensile stress in the amorphous material 14 by the combination of the diaphragm 6, the piston 7 and the spring 10 of the pressure sensor 1. The tensile stress is then converted into an electrical signal, and such conversion is described below with reference to the experimental data illustrated in FIGS. 10e and 10f.

Referring to FIGS. 10a to 10d, a pair of strips 14 of an amorphous, magnetically soft metal material are bonded together integrally by using an epoxy adhesive. Two of such assemblies are integrally joined to a substrate 30 of an epoxy resin with an epoxy adhesive while maintaining a parallel relationship between the both assemblies. In this manner, the core 26 is formed, and is placed on a pair of mounts 82, 83 with the strips 14 located on the bottom side of substrate 30. A push-pull gauge is used to apply a load to the central portion of the upper surface of the core 26 in order to determine the voltage $V_x$ and the time delay $t_d$ with respect to the tensile lod x applied to the strips 14. The dimensions and the amorphous material used are indicated as Cases No. 5 and 6 in the Table 2, together with the designation of Figures which illustrate the data obtained.

In Case No. 5, the data of FIG. 10e indicates that a high acuracy voltage $V_x$ is obtained for a tensile load y of zero to 0.3 kg. In Case No. 6, the data of FIG. 10f indicates that a time delay $t_d$ having a high linearity and exhibiting a large change is obtained for a tensile load of zero to 0.3 kg.

Figure 11:
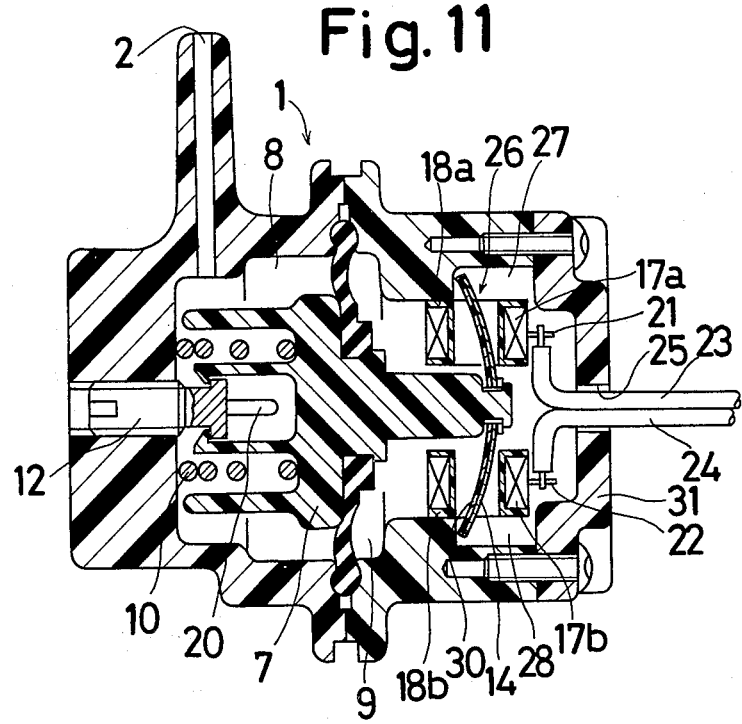
FIG. 11 is a longitudinal cross-sectional view of a pressure sensor according to a fourth embodiment of the invention.

Fourth Embodiment (FIG. 11)

In the pressure sensor 1 shown in FIG. 11, the core 26 is defined by the amorphous, magnetically soft metal material 14 which is integrally joined to the convex or right-hand surface of an elastic member 30, which assumes a more strongly flexed configuration than that shown in FIG. 11 in its free condition. The amorphous material 14 is joined to the elastic member 30 when the latter assumes its free condition. The opposite ends of the core 26 are supported by grooves 27, 28 and the central portion of the core 26 is joined to the right-hand end of the holder 7 by crimping. The screw 12 is adjusted so that when the atmospheric pressure prevails in the first space 8, the core 26 is urged into its deformed condition or a flatter configuration shown in FIG. 11 under a loading applied by the piston 7. This deformation produces an initial compressive stress in the entire amorphous material 14. A pair of coil portions 17a, 17b are disposed on individual bobbins 18a, 18b in the same direction of winding, and are connected in series with each other to form a coil 17. A stop 20 limits the displacement of the piston 7 to the left in order to prevent an inflection of the core 26.

When a negative pressure is introduced into the first inner space 8 through the inlet 2, the diaphragm 6 and the piston 7 are displaced in accordance with the magnitude of the negative pressure and against the resilience of the spring 10 in a direction to reduce the inner space 8 or to the left. The displacement of the piston 7 causes the core 26 to be deformed into a flatter configuration, whereby the compressive stress produced in the amorphous material 14 joined to the elastic member 30 increases from its initial value in accordance with the displacement of the piston 7 to the left. The pressure sensor 1 shown in FIG. 11 may be used in combination with one of the electrical processing circuits 100, 120, 140 and the logical processing unit 160 to derive an electrical signal which corresponds to the negative hydraulic pressure.

Figure 12:
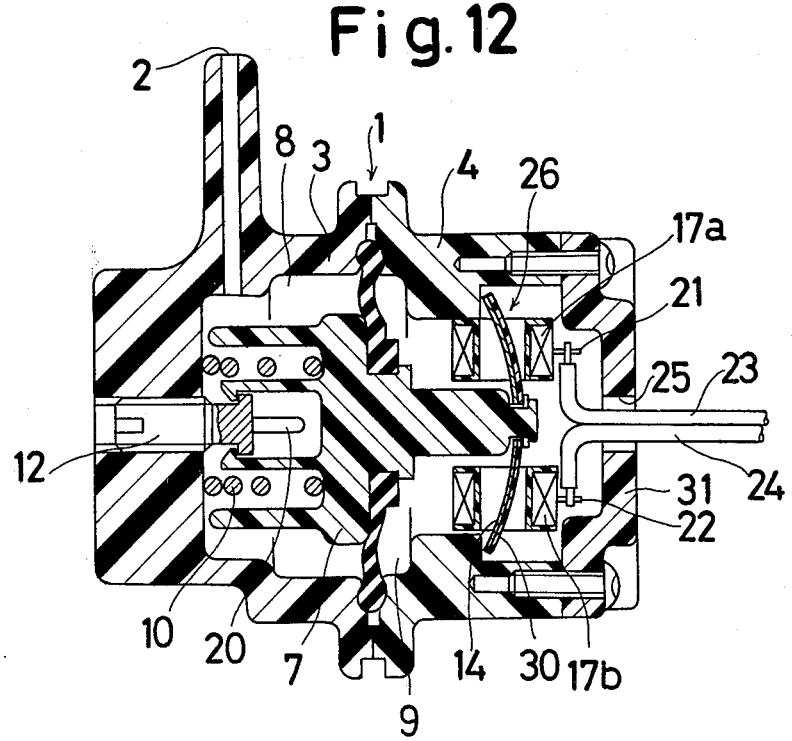
FIG. 12 is a longitudinal cross-sectional view of a pressure sensor according to a fifth embodiment of the invention.

Fifth Embodiment (FIG. 12)

In the pressure sensor 1 shown in FIG. 12, the amorphous, magnetically soft metal material 14 is applied to the concave or left-hand surface of the elastic member 30 which assumes a more flexed configuration than that shown in FIG. 12 in its free condition, thus forming the core 26. The amorphous material 14 is integrally joined to the elastic member 30 while the latter is in its free condition. The screw 12 is adjusted so that when the atmospheric pressure prevails in the first space 8, the core 26 is deformed from its free configuration into the flatter configuration shown in FIG. 12 under loading applied by the piston 7. Consequently, an initial tensile stress is produced in the entire amorphous material 14 as a result of such deformation.

When a negative pressure is introduced into the first inner space 8 through the inlet 2, the diaphragm 6 and the piston 7 are displaced in accordance with the magnitude of the negative pressure and against the resilience of the spring 10 in a direction to reduce the first space 8 or to the left. The displacement of the piston 7 causes the core 26 to be deformed into a flatter configuration, so that the tensile stress produced in the amorphous material 14 which is integrally joined with the elastic member 30 increases from its initial value in accordance with the displacement of the piston 7 to the left. The pressure sensor 1 shown in FIG. 12 can be used in combination with one of the electrical processing circuits 100, 120, 140 or the logical processing unit 160 to derive an electrical signal which corresponds to the negative hydraulic pressure.

In the pressure sensors shown in FIGS. 11 and 12, the core 26 is deformed in a direction to reduce the second inner space 9, allowing a spring of a reduced resilience to be used for the spring 10. It will also be noted that in the pressure sensors shown in FIGS. 11 and 12, an initial stress is previously produced in the amorphous material 14 to permit a region of its response having a good linearity with respect to the pressure to be used for deriving an electrical signal with a high accuracy.

Figure 13:
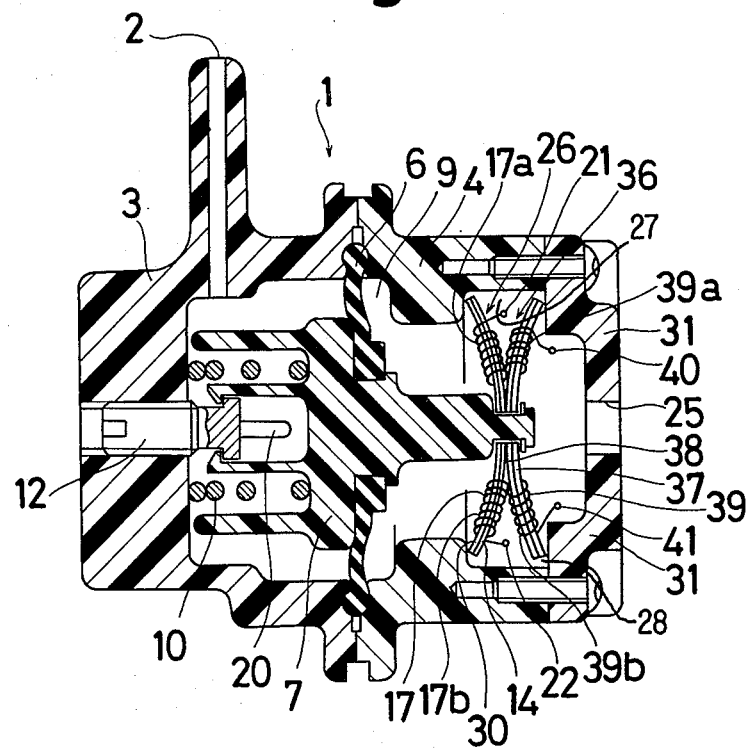
FIG. 13 is a longitudinal cross-sectional view of a pressure sensor according to a sixth embodiment of the invention.
Figure 14A:
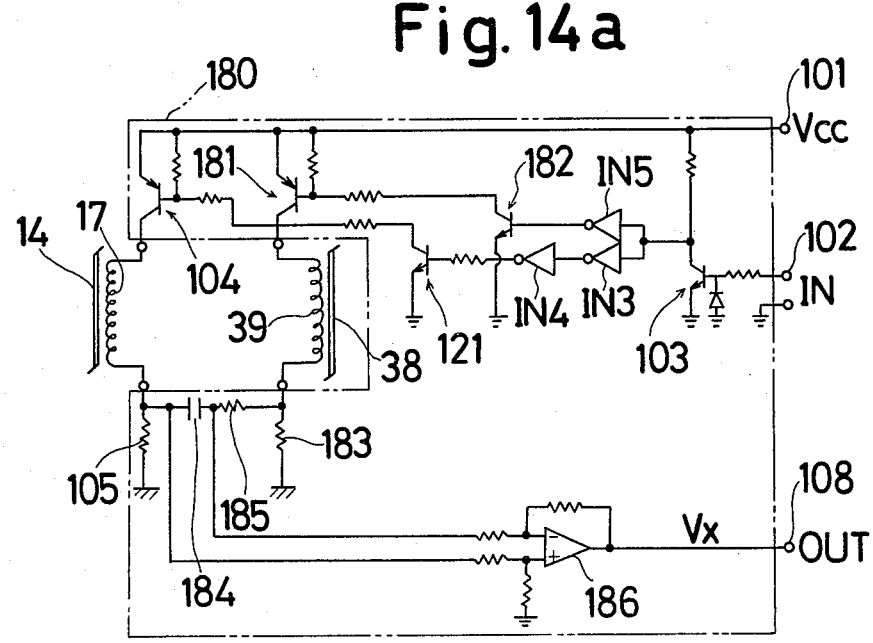
FIG. 14a is a circuit diagram of an electrical processing circuit which is connected to the electrical coil of the pressure sensor to derive an analog voltage of a level which depends on the pressure detected.
Figure 14B:
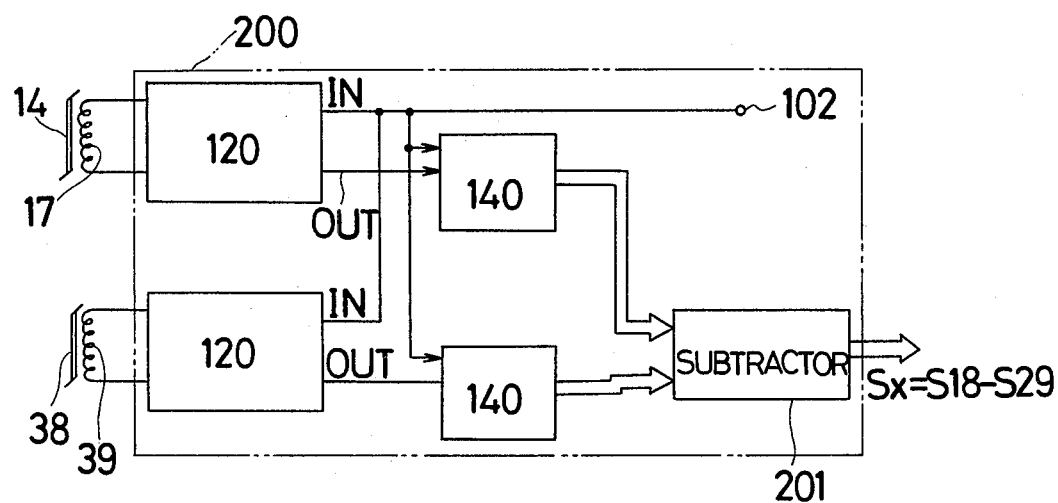
FIG. 14b is a circuit diagram of another electrical processing circuit which is connected to the electrical coil of the pressure sensor to produce a digital code which represents the pressure detected.
Figure 14C:
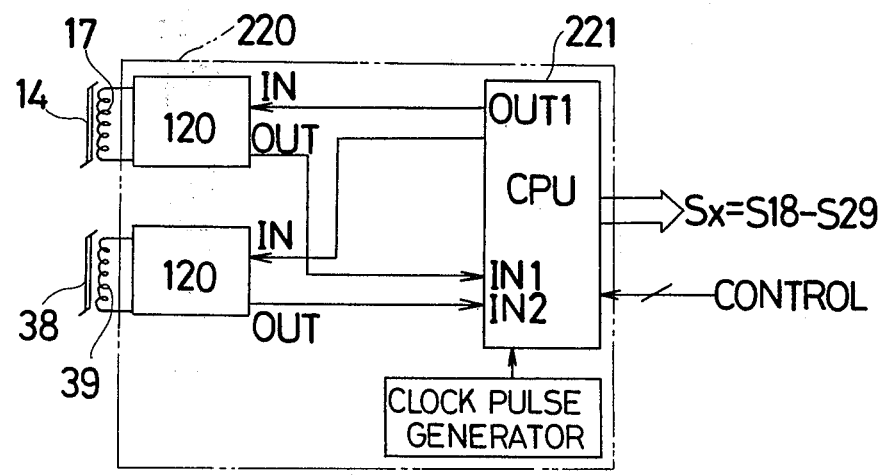
FIG. 14c is a block diagram of an electronic logical processing unit connected to the electrical coil of the pressure sensor to form a digital code which depends on the pressure detected.

Sixth Embodiment (FIGS. 13 to 14c)

The pressure sensor 1 shown in FIG. 13 includes another core 36 in addition to the core 26 which is the same as that used in the pressure sensor of FIG. 11. The core 36 comprises an amorphous, magnetically soft metal material 38 applied to the convex or left-hand surface of an elastic member 37 which is adapted to assume a more flexed configuration than that shown in FIG. 13 in its free condition, in the same manner as the core 26, and which may be formed of epoxy resin, vinyl chloride resin or beryllium copper, for example. The amorphous material 38 is integrally joined with the elastic member 37 when the latter remains in its free condition. The cores 26, 36 are secured to the right-hand end of the piston 7 by crimping, with the central portions of the amorphous materials 14, 38 which are integrally joined with the convex surfaces of these cores abutting against each other. The opposite ends of the respective cores are supported by the left-hand end of the grooves 27, 28 and by the left-hand end of a cover 31, respectively. The screw 12 is adjusted so that when the atmospheric pressure prevails in the first inner space 8, the both cores 26, 36 are deformed into a flatter configuration under a loading applied by the piston 7 as shown in FIG. 13. Accordingly, an initial compressive stress of an equal magnitude is produced in each of the amorphous materials 14, 38. As with the core 26, the core 36 is provided with a coil 39 which comprises a pair of coil portions 39a, 39b which are disposed on the core 36 with a vinyl tape interposed therebetween. Coil portions 39a, 39b have the same direction of winding and are connected in series with each other. The opposite ends of the coil 39 are connected to a pair of terminals 40, 41. A stop limits the displacement of the holder 7 to the left in order to prevent an inflection of the core 26 and to permit the opposite ends of the core 36 to be maintained supported. When a negative pressure is introduced into the first inner space 8 through the inlet 2, the diaphragm 6 and the piston 7 are displaced in accordance with the magnitude of the negative pressure and against the resilience of the spring 10, in a direction to reduce the first space 8 or to the left. The displacement of the piston 7 causes the core 26 to be deformed into a flatter configuration and causes the core 36 to be deformed towards its free configuration. Thus, the compressive stress produced in the amorphous material 14 of the core 26 increases from its initial value in accordance with the displacement of the piston 7 to the left while the compressive stress produced in the amorphous material 38 of the core 36 decreases from its initial value in accordance with the displacement of the piston 7 to the left.

The pressure sensor 1 shown in FIG. 13 may be used in combination with one of electrical processing circuits 180, 200, or logical processing unit 220 shown in FIGS. 14a, 14b and 14c, respectively, to derive an electrical signal which corresponds to the negative hydraulic pressure.

FIG. 14a shows an electrical processing circuit 180 which produces an analog voltage $V_x$ in accordance with the location of the piston 7 in the pressure sensor 1 shown in FIG. 13. Specifically referring to the circuit 180, an NPN transistor 103 is turned on during the time an input voltage pulse (IN) remains at its positive level, and is turned off during the time the input voltage pulse assumes a ground level. The collector voltage of the transistor 103 is amplified and shaped by a pair of inverting amplifiers IN3 and IN4 before it is applied to the base of an NPN transistor 121. Thus, when the input voltage pulse (IN) assumes its positive level, the transistor 103 is turned on while the transistor 121 is turned off. Consequently, a PNP transistor 104 is turned off during such time interval. While the transistor 103 is off, the transistor 121 is on and the transistor 104 is on during the time the input voltage pulse assumes the ground level. In other words, a pulse voltage is applied to the coil 17 in a similar manner as in the circuit 120 of FIG. 3a, whereby a voltage pulse appears across a resistor 105 with a time lag $t_{d1}$ from the falling edge of the input voltage pulse (IN) in a manner corresponding to the magnitude of the stress produced in the amorphous, magnetically soft member 14. A pulse voltage is also applied to the other electrical coil 39 through a PNP transistor 181. Since the transistor 103 is turned on to cause an inverting amplifier IN5 to produce positive output which in turn turns an NPN transistor 182 on during the time the input voltage pulse (IN) assumes its positive level, the transistor 181 is also turned on, while the latter is turned off when the input voltage pulse (IN) assumes a ground level. As a result, a constant supply voltage Vcc is applied to the second coil 39 when no voltage is applied to the first coil 17 while no voltage is applied to the second coil when a constant supply voltage is applied to the coil 17. Stated differently, the constant supply voltage Vcc is applied to the first and the second coils 17, 39 in alternate fashion in accordance with the input voltage pulse (IN). The second coil 39 is connected to a resistor 183, across which a voltage pulse appears. The pulse across resistor 183 has a rising edge which lags behind the rising edge of the input voltage pulse (IN) by a time interval of $t_{d2}$ which depends on the magnitude of the stress produced in the amorphous, magnetically soft member 38. The voltage Vx1 developed across the resistor 105 is applied to one plate of a capacitor 184, while the voltage $V_{x2}$ developed across the resistor 183 is applied to the other plate of the capacitor 184. Stresses produced in the amorphous, magnetically soft members 14, 38 are represented by $x_1$ and $x_2$, respectively. Since $x_1$ and $x_2 = k$ (constant), and since $V_{x1}$ and $V_{x2}$ are proportional to the magnitude of $x_1$ and $x_2$, respectively, the potential difference across the capacitor 184 corresponds to the magnitude of $(x_1-x_2)$. The capacitor 184 forms an integrator together with a resistor 185, thus producing a voltage thereacross which corresponds to the magnitude of $(x_1-x_2)$. Since $x_2 = k-x_1$, $x_1-x_2 = 2x_1+k$. Thus, the voltage across the capacitor 184 corresponds to the magnitude of $2x_1$. That is, an analog voltage is obtained which corresponds to twice the stress $x_1$ produced in the amorphous member 14 as referenced to the magnetically soft member 14 of the core 26. The opposite ends of the capacitor 184 are connected to both inputs of an operational amplifier 186 which is designed as a differential amplifier. The amplifier 186 produces an analog output $V_x$ which corresponds to $2x_1$.

FIG. 14b shows another electrical processing circuit 200 which provides a pair of pulses which lag behind the rising edge of the input pulse by time intervals of $t_{d1}$ and $t_{d2}$, respectively. These pulses are applied to a pair of counter circuits 140, respectively, where they are converted into a pair of codes S14 and S38 which represent the magnitude of $t_{d1}$ and $t_{d2}$. These codes are applied to a subtractor 201, which calculates $t_{d1}-t_{d2}$, producing a digital output code Sx = S14−S38 which represents $t_{d1}-t_{d2}$ or $2x_1$. FIG. 14c illustrates an electronic logical processing unit 220 including a single chip microcomputer 221 which applies a single pulse to the circuit 120 connected to the electrical coil 17 while initiating a time counting operation from the rising edge thereof to obtain $t_{d1}$ count data S14, which is retained. Subsequently, the microcomputer applies a single pulse to the circuit 120 connected to the electrical coil 39 while initiating the time counting operation from the rising edge thereof to obtain $t_{d2}$ count data S38. Then it calculates a difference $(t_{d1}-t_{d2})$, to produce a corresponding output code $Sx=S14-S38$. As long as a measurement command control signal is present, the microcomputer continues such operation.

Figure 15:
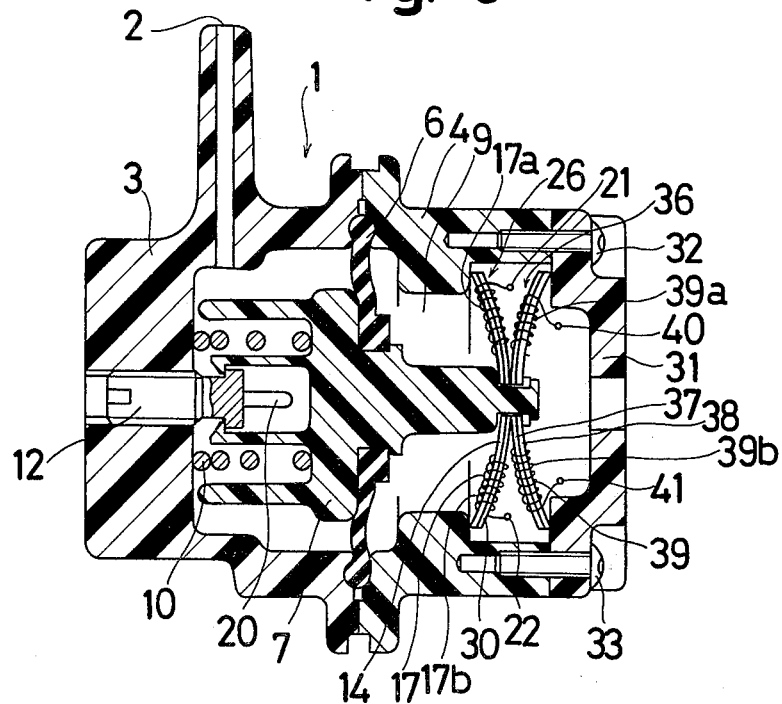
FIG. 15 is a longitudinal cross-sectional view of a pressure sensor according to a seventh embodiment of the invention.

Seventh Embodiment (FIG. 15)

The pressure sensor 1 shown in FIG. 15 differs from the pressure sensor of FIG. 13 only in that the cores 26, 36 are defined by integrally joining the amorphous materials 14, 38 to the concave sides of the respective elastic members 30, 37. With this arrangement, the individual cores 26, 36 are deformed into a flatter configuration, as indicated in FIG. 15. When the atmospheric pressure prevails in the first inner space 8, an initial compressive stress of an equal magnitude is produced in the respective amorphous materials 14, 38 in response to a loading applied to the piston 7. When a negative pressure is introduced into the first space 8 through the inlet 2, the diaphragm 6 and the piston 7 are displaced in accordance with the magnitude of the negative pressure and against the resilience of the spring 10, in a direction to reduce the first inner space 8 or to the left. The displacement of the piston 7 causes the core 26 to be deformed into a flatter configuration and causes the core 36 to be restored toward its free bowed configuration. As a result, the tensile stress produced in the amorphous material 14 of the core 26 increases from its initial value in accordance with the displacement of the piston 7 to the left while the tensile stress produced in the amorphous material 38 of the core 39 decreases from its initial value in accordance with the displacement of the piston 7 to the left. The pressure sensor 1 shown in FIG. 15 may be used in combination with one of electrical processing circuits 180, 200 or logical processing unit 220 shown in FIGS. 14a, 14b and 14c, respectively, to derive an electrical signal which corresponds to the negative hydraulic pressure.

Figure 16:
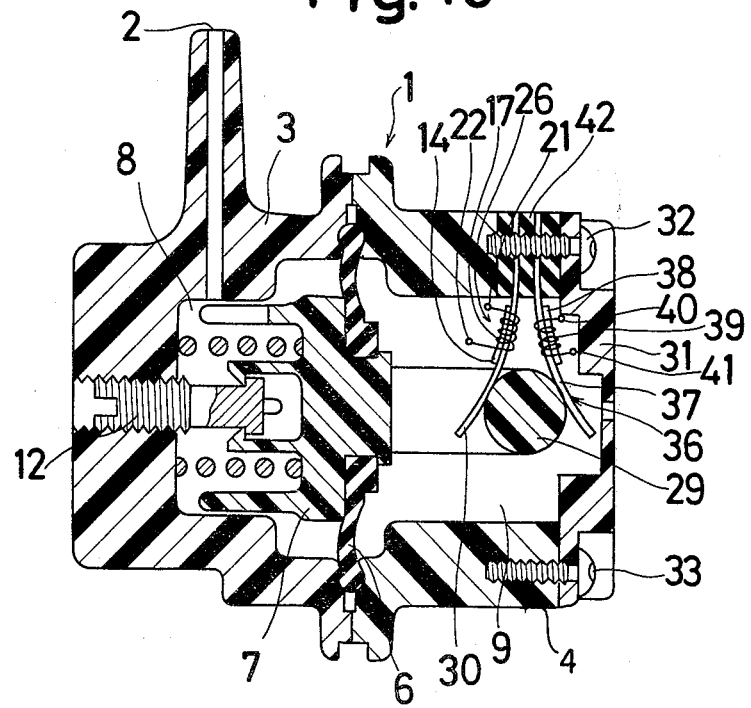
FIG. 16 is a longitudinal cross-sectional view of a pressure sensor according to an eighth embodiment of the invention.

Eighth Embodiment (FIG. 16)

The pressure sensor 1 shown in FIG. 16 includes a pair of elongate elastic members 30, 37, which have their one end secured to the body 4 by means of a bolt 32 which is used to mount a cover 31 on the body 4, with a bushing 42 interposed between their ends to maintain a given space therebetween. In their free condition, the elastic members 30, 37 are in the form of flat strips. An amorphous, magnetically soft metal material 14, 38 is integrally joined to the left-hand surface of the elastic member 30 and to the right-hand surface of the elastic member 37, respectively, when these elastic members are in their free flat configuration, thus defining cores 26, 36. Coils 17, 39 are disposed on the cores 26, 36, respectively, in the region where the amorphous materials 14, 38 are joined to the elastic members. A pin 29 formed on the right-hand end of the piston 7 is interposed between the other ends of the both elastic members 30, 37. When the atmospheric pressure prevails in the first inner space 8, the pin 29 causes the cores 26, 36 to be flexed to an equal extent, as illustrated in FIG. 16, whereby an initial compressive stress of an equal magnitude is produced in each of the amorphous materials 14, 38. When a negative pressure is introduced into the first inner space 8 through the inlet 2, the diaphragm 6 and the piston 7 are displaced in accordance with the magnitude of the negative pressure and against the resilience of the spring 10, in a direction to reduce the first inner space 8 or to the left. The displacement of the piston 7 causes the core 26 to be deformed to a greater flexure and causes the core 36 to be restored toward its free or flat configuration. As a consequence, the compressive stress produced in the amorphous material 14 of the core 26 increases from its initial value in accordance with the displacement of the piston 7 to the left while the compressive stress produced in the amorphous material 38 of the core 36 decreases from its initial value in accordance with the displacement of the piston 7 to the left. When the amorphous materials 14, 38 are joined integrally with the surface of the elastic members 30, 37 in a region between the location where the stress concentration occurs or the location of the pin 29 and the fulcrum or the location of the bushing 42, a change in the stress can be increased, thus increasing a change in the magnetic permeability of the amorphous material. The pressure sensor 1 shown in FIG. 16 can be used in combination with one of electrical processing circuits 180, 200 or logical processing unit 220 shown in FIGS. 14a, 14b and 14c, respectively, to derive an electrical signal which corresponds to the negative hydraulic pressure.

Figure 17:
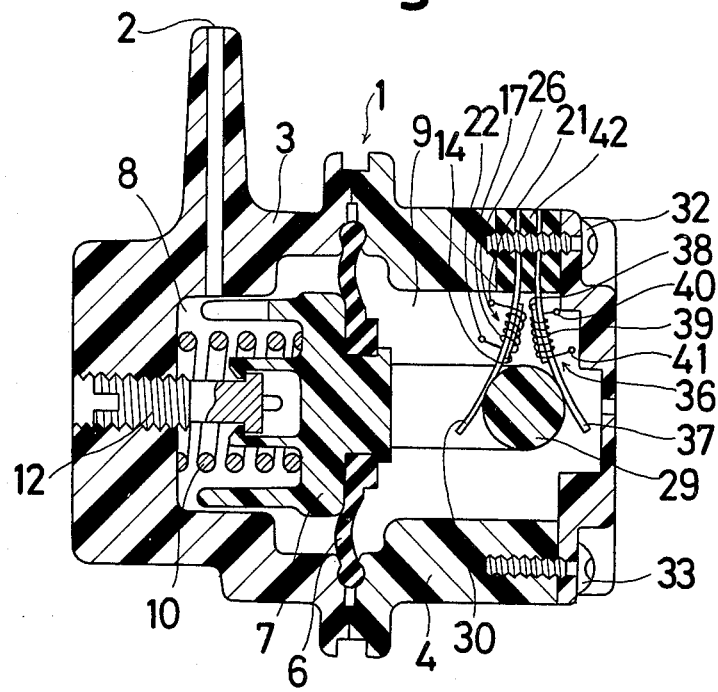
FIG. 17 is a longitudinal cross-sectional view of a pressure sensor according to a ninth embodiment of the invention.

Ninth Embodiment (FIG. 17)

The pressure sensor 1 shown in FIG. 17 is similar to the pressure sensor of FIG. 16 except that the amorphous, magnetically soft metal material 14 is applied to the right-hand surface of the elastic member 30 and the amorphous, magnetically soft metal material 38 is applied to the left-hand surface of the elastic member 37, respectively, in an integral manner to define the cores 26, 36. With this arrangement, when the atmospheric pressure prevails in the first inner space 8, the amorphous materials 14, 38 experience an initial tensile stress of an equal magnitude, as illustrated in FIG. 17. When a negative pressure is introduced into the first inner space 8 through the inlet 2, the diaphragm 6 and the piston 7 and displaced in accordance with the magnitude of the negative pressure against the resilience of the spring 10, in a direction to reduce the first inner space 8 or to the left. The displacement of the piston 7 causes the core 26 to be deformed into a more strongly flexed configuration, and causes the core 36 to be restored towards it free or flat condition. As a result, the tensile stress produced in the amorphous material 14 of the core 26 increases from its initial value in accordance with the displacement of the piston 7 to the left while the tensile stress produced in the amorphous material 38 of the core 36 decreases from its initial value in accordance with the displacement of the piston 7 to the left. The pressure sensor 1 shown in FIG. 17 may be used in combination with one of the electrical processing circuits 180, 200 and logical processing unit 220 shown in FIGS. 14a, 14b and 14c, respectively, to derive an electrical signal which corresponds to the negative hydraulic pressure.

It will be understood that the pressure sensors shown in FIGS. 13, 15, 16 and 17 utilize two cores, each comprising an amorphous, magnetically soft material, in a manner such that one of the cores has its stress increased while the other decreased in response to the pressure applied so that a difference in the change of the permeability of the both amorphous materials in response to the stress change can be detected to provide an amplification of the resulting signal. If an external magnetic field is applied during the operation of the sensor to detect the pressure, the resulting changes in the permeability of the amorphous materials cancel each other, producing no net effect.

Figure 18:
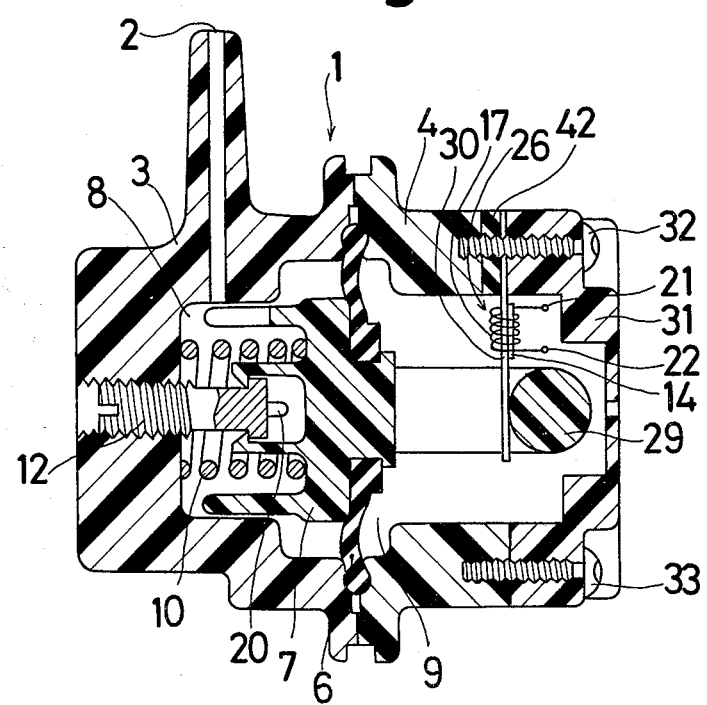
FIG. 18 is a longitudinal cross-sectional view of a pressure sensor according to a tenth embodiment of the invention.

Tenth Embodiment (FIG. 18)

In the pressure sensor 1 shown in FIG. 18, an elongate elastic member 30 has its one end secured between a bushing 42 and a cover 31 by means of a bolt 32. The core 26 comprises an amorphous, magnetically soft metal material 14 applied integrally to the right-hand surface of the elastic member 30 as indicated in FIG. 18. A coil 17 is disposed on the core 26 in a region where the amorphous material 14 is applied. The screw 12 is adjusted so that when the atmospheric pressure prevails in the first inner space 8, the core 16 is subject to no loading by a pin 29 which is formed on the right-hand end of the piston 7 so as to bear against the right-hand surface of the other end of the elastic member 30. No stress is then produced in the amorphous material 14. pressure sensor 1. The tensile stress is then converted into a corresponding electrical signal. This will be described below with reference to experimental data illustrated in FIGS. 19e to 19h.

Referring to FIGS. 19a to 19d, a pair of strips 14 of an amorphous, magnetically soft metal material are integrally joined together by means of an epoxy adhesive. Two of such assemblies are integrally joined to a substrate 30, also formed of an epoxy resin, while maintaining a parallel relationship therebetween, thereby providing the core 26. The left-hand end of the core 26 is clamped by a vise 81, with the amorphous material 14 located on the top side of substrate 30. A dial gauge (not shown) is located at a distance of 5 mm from the right-hand end of the core 26 to determine the voltage $V_x$ and the time delay $t_d$ with respect to the deflection z in the Y-direction of the core 26. Also, a push-pull gauge (not shown) is used with the core 26 in position to apply a load in the Y-direction thereto, thus determining the voltage $V_x$ and the time delay $t_d$ with respect to the tensile load x in the amorphous material 14. The dimensions a to e and the amorphous material used as well as the designation of Figures which illustrate the resulting data are tabulated as Cases No. 7 to 10 in the Table 3 below.

TABLE 3

Figure 19A:
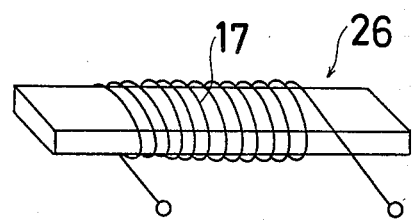
FIG. 19a is a perspective view of the core used in the pressure sensor of FIG. 18, in which one end of the core is subjected to a deflection or a load applied to such end to derive an indicating voltage $V_x$ and a pulse time delay $t_d$ which correspond to the deflection or the load applied.
Figure 19B:
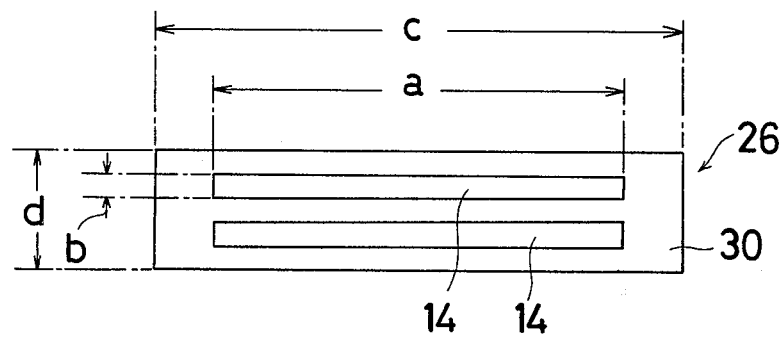
FIG. 19b is a plan view of the core of FIG. 19a, with the electrical coil omitted from illustration.
Figure 19C:
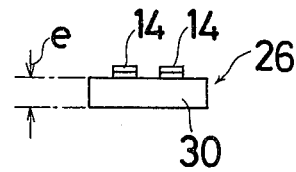
FIG. 19c is a right-hand side elevational view of the core shown in FIG. 19b.
Figure 19D:
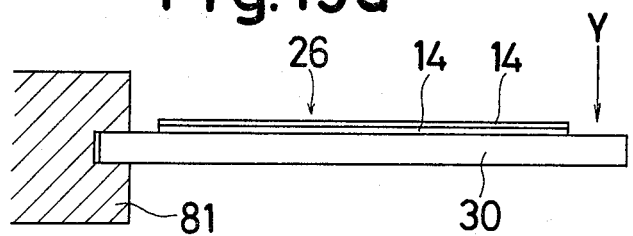
FIG. 19d is a front view of an experimental layout for applying a deflection or a tensile load to the magnetically soft amorphous material in the core illustrated in FIGS. 19a to 19c, with the electrical coil omitted from illustration.
Figure 19E:
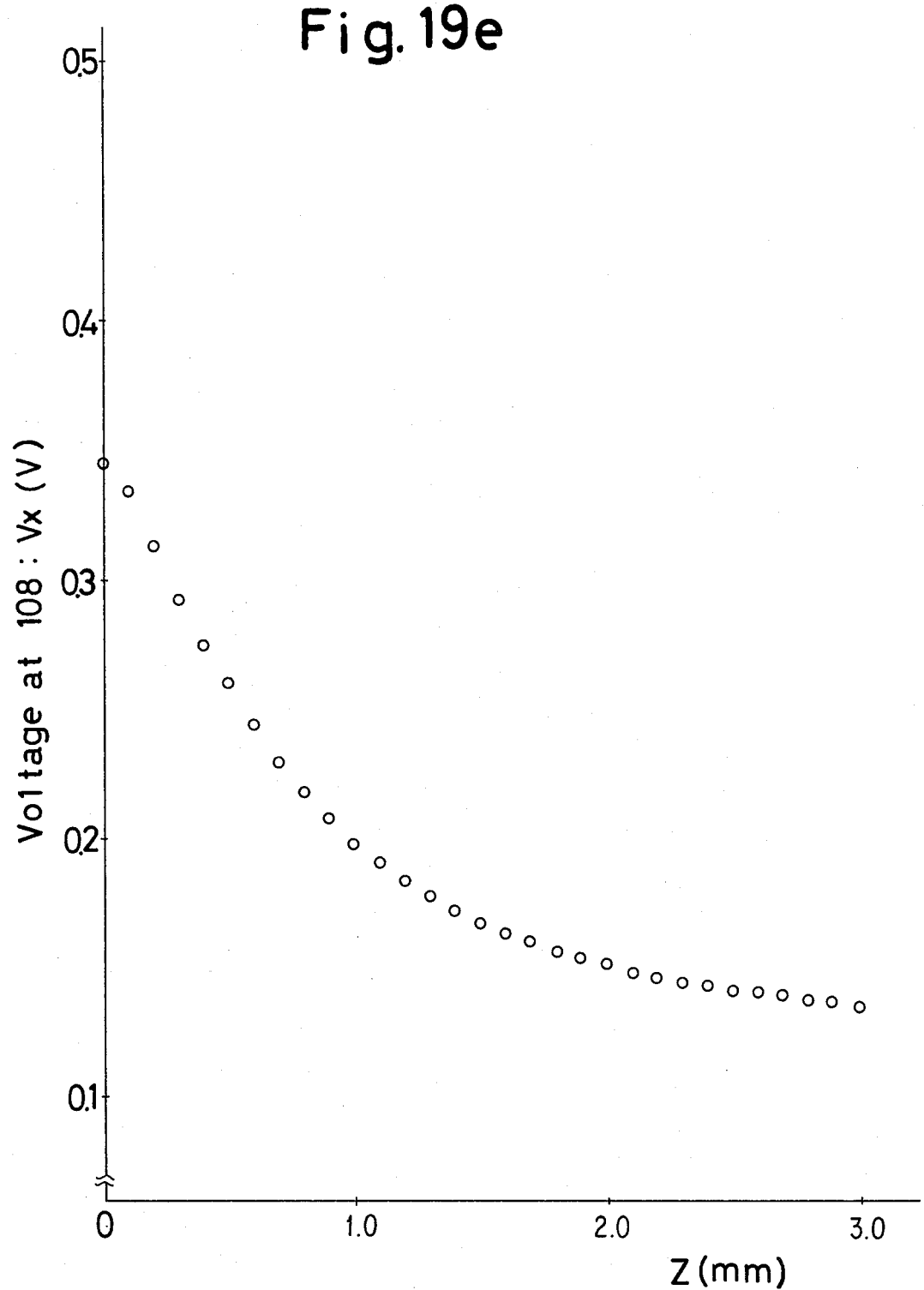
FIG. 19e is a graph which shows data representing the indicating voltage $V_x$ with respect to the deflection x which is obtained by utilizing the dimensions and the layout illustrated in FIGS. 19a to 19d and by utilizing the electrical processing circuit shown in FIG. 2a which is connected to the electrical coil.
Figure 19F:
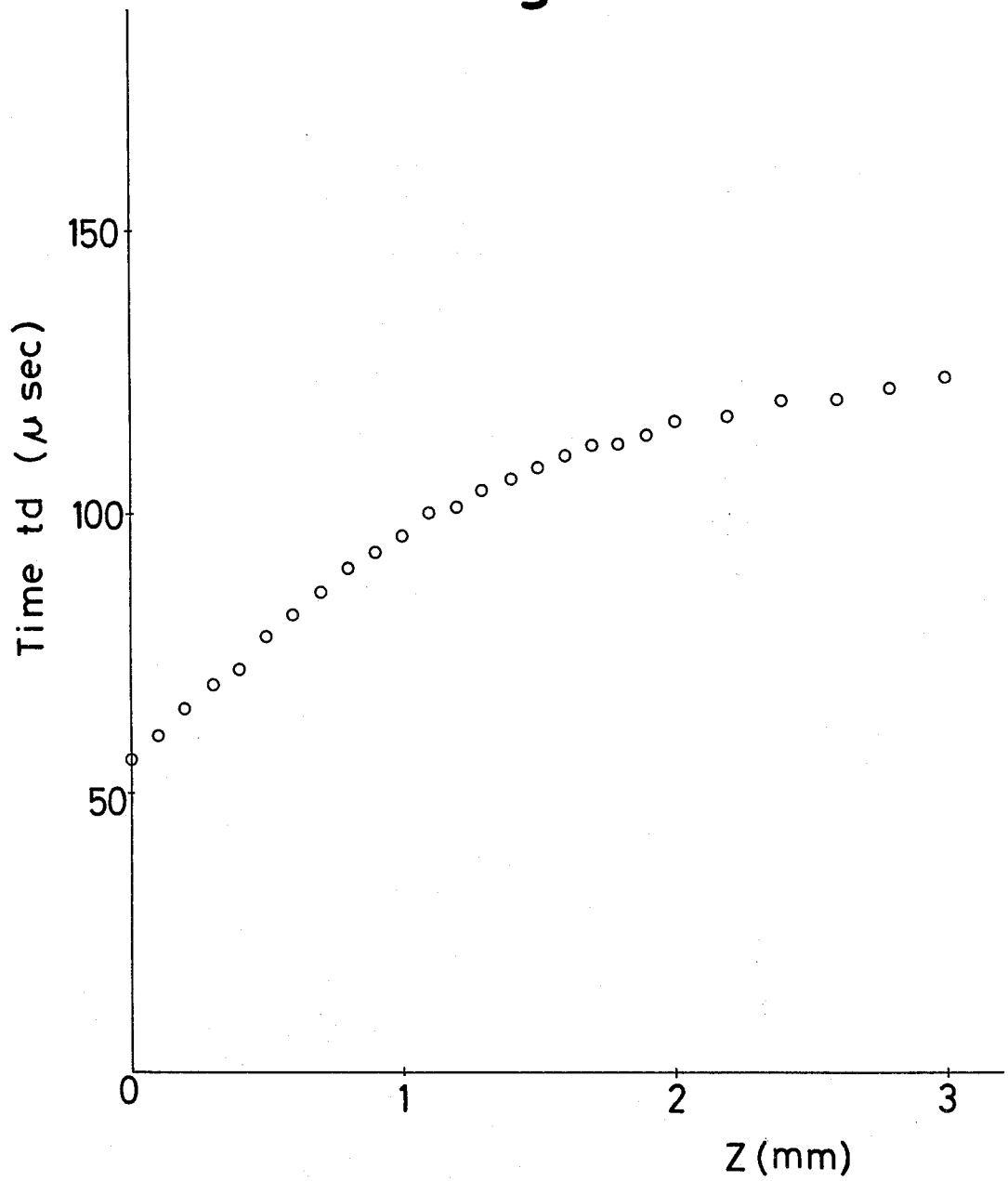
FIG. 19f is a graph which shows data indicative of the time delay $t_d$ with respect to the deflection which is obtained by utilizing the dimensions and the layout illustrated in FIGS. 19a to 19d and by utilizing the electrical processing circuit shown in FIG. 3a which is connected to the electrical coil.
Figure 21A:
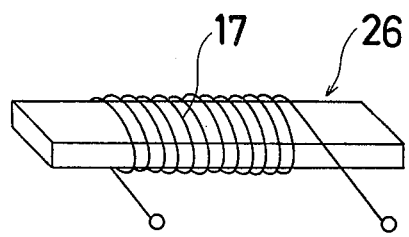
FIG. 21a is a perspective view of the core of the pressure sensor shown in FIG. 20, in which one end of the core is subjected to a deflection or a load applied to such end to derive an indicating voltage $V_x$ and a pulse time delay $t_d$ which depend on the deflection or the load applied.
Figure 21B:
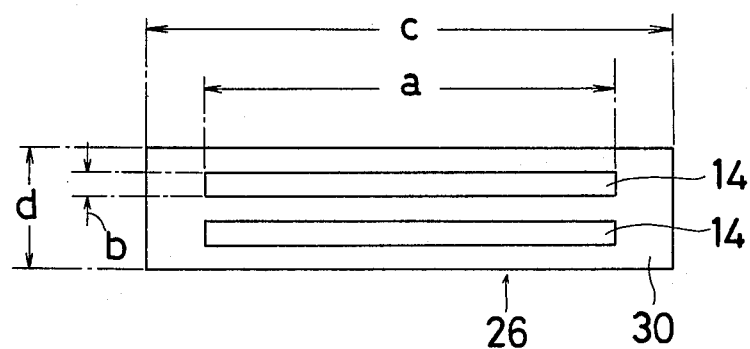
FIG. 21b is a bottom view of the core shown in FIG. 21a, with the electrical coil omitted from illustration.
Figure 21C:
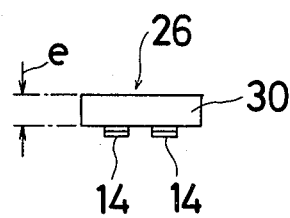
FIG. 21c is a right-hand side elevational view of the core shown in FIG. 21b.
Figure 21D:
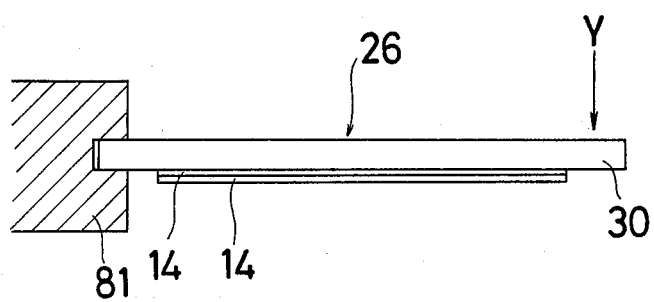
FIG. 21d is a front view of an experimental layout for applying a deflection or a compressive load to the amorphous material in the core shown in FIGS. 21a to 21c, with the electrical coil being omitted from illustration.
Figure 21E:
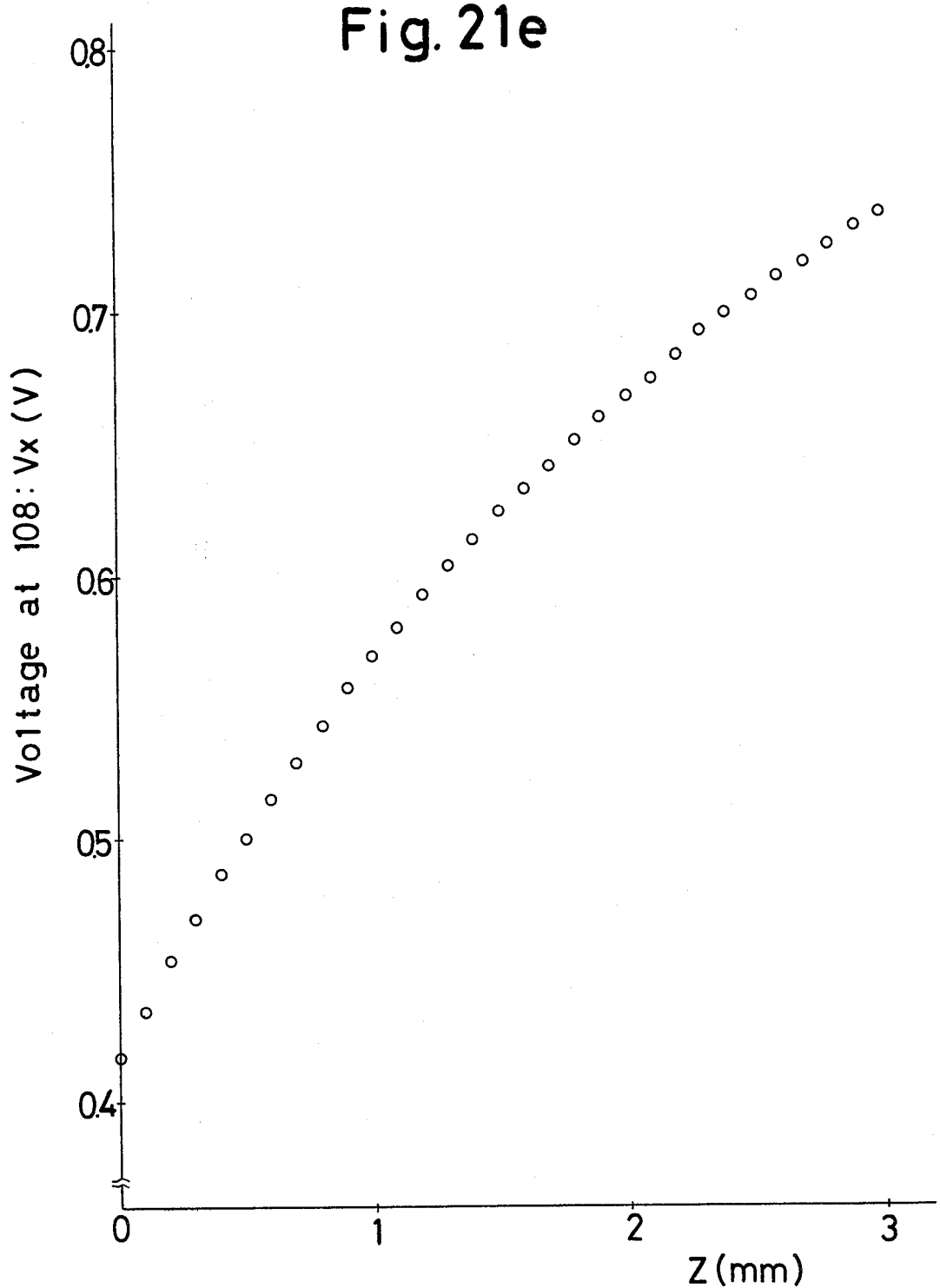
FIG. 21e is a graph which illustrates data representing the indicating voltage $V_x$ with respect to the deflection which is obtained by utilizing the dimensions and the layout shown in FIGS. 21a to 21d and by utilizing the electrical processing circuit shown in FIG. 2a which is connected to the electrical coil.

| Case No. | Amorphous Magnetically Soft Materail 14 | | | | Elastic Member 30 | | | Coil 17 | | Data |
|---|---|---|---|---|---|---|---|---|---|---|
| | Material, Atomic Weight Percent | Thickness mm | a (mm) | b (mm) | Number of Sheets | c (mm) | d (mm) | e (mm) | Number of Turns | Measuring means and frequency of input pulse | |
| 7 | $Fe_{40}Ni_{40}P_{14}R_6$ | 0.058 | 80 | 1.8 | 4 | 95 | 6 | 0.6 | 2000 | Circuit 100 5 kHz | FIG. 19e |
| 8 | " | " | " | " | " | " | " | " | " | Circuit 120 & Syncroscope 100 Hz | FIG. 19f |
| 9 | " | " | " | " | " | " | " | " | " | Circuit 100 5 kHz | FIG. 19g |
| 10 | " | " | " | " | " | " | " | " | " | Circuit 120 & Syncroscope 100 Hz | FIG. 19h |
| 11 | " | " | " | " | " | " | " | " | " | Circuit 100 5 kHz | FIG. 21e |
| 12 | " | " | " | " | " | " | " | " | " | Circuit 120 & Syncroscope 100 Hz | FIG. 21f |
| 13 | " | " | " | " | " | " | " | " | " | Circuit 100 5 kHz | FIG. 21g |
| 14 | " | " | " | " | " | " | " | " | " | Circuit 120 & Synchroscope 100 Hz | FIG. 21h |

When a negative pressure is introduced into the first inner space 8 through the inlet 2, the diaphragm 6 and the piston 7 are displaced in accordance with the magnitude of the negative pressure against the resilience of the spring 10, in a direction to reduce the first inner space 8 or to the left. The displacement of the piston 7 causes the other end of the core 26 to be urged by the pin 29 to flex to the left, whereby a tensile stress is produced in the entire amorphous material 14 which is integrally joined with the elastic member 30.

The pressure sensor 1 shown in FIG. 18 may be used in combination with one of the electrical processing circuits 100, 120, 140 or logical processing unit 160 mentioned previously, to derive an electrical signal which corresponds to the negative hydraulic pressure. As mentioned previously, the conversion initially begins by converting the negative hydraulic pressure which prevails in the inlet 2 into a tensile stress produced in the amorphous material 14 by the combination of the diaphragm 6, the piston 7 and the spring 10 of the In Case No. 7, the data shown in FIG. 19e indicates that a voltage $V_x$ can be obtained with a high accuracy for a deflection z from zero to 1.8 mm. In Case No. 8, the data of FIG. 19f indicates that the time delay $t_d$ has a good linearity and exhibits a large change for the deflection z from zero to 0.9 mm and from 1.0 to 1.8 mm. In Case No. 9, the data of FIG. 19g indicates that a voltage $V_x$ of a high accuracy can be obtained for a tensile load y from zero to 100 g. In Case No. 10, the data of FIG. 19h shows that a time delay $t_d$ having a good linearity and exhibiting a large change can be obtained for a tensile load from zero to 0.1 kg.

Figure 20:
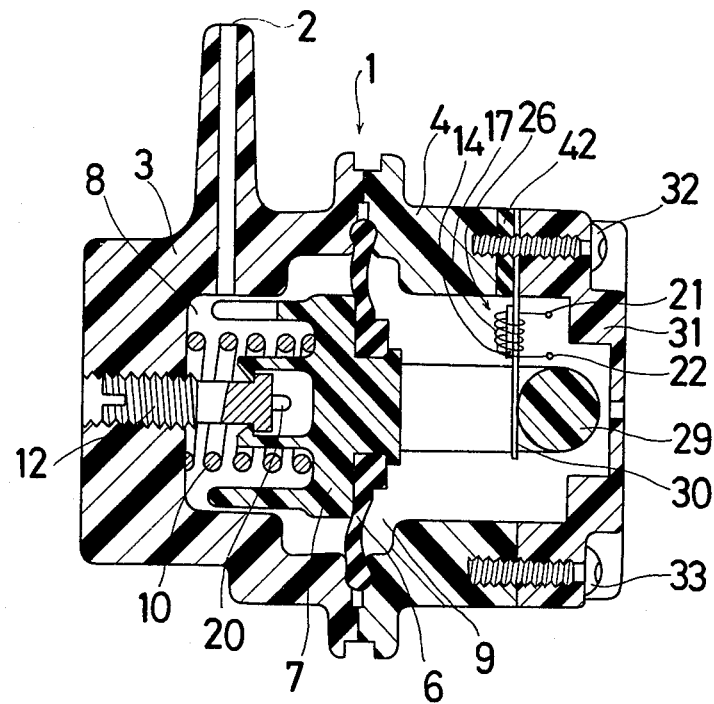
FIG. 20 is a longitudinal cross-sectional view of a pressure sensor according to an eleventh embodiment of the invention.

Eleventh Embodiment (FIG. 20)

The pressure sensor 1 shown in FIG. 20 is similar to the pressure sensor shown in FIG. 18 except that the amorphous material 14 is integrally joined with the left-hand surface of the elastic member 30. With this arrangement, when a negative pressure is introduced into the first inner space 8 through the inlet 2, the diaphragm 6 and the piston 7 are displaced in accordance with the magnitude of the negative pressure against the resilience of the spring 10, in a direction to reduce the first inner space 8 or to the left. The displacement of the piston 7 causes the other end of the core 26 against which the pin 29 abuts to be flexed to the left under a loading applied by the pin 29. Hence, a compressive stress is produced in the entire amorphous material 14 which is integrally joined with the elastic member 30.

The pressure sensor 1 shown in FIG. 20 can be used in combination with one of the electrical processing circuits 100, 120, 140 or logical processing unit 160 to derive an electrical signal which corresponds to the negative hydraulic pressure. Initially, the negative hydraulic pressure which prevails in the inlet 2 is converted into a compressive stress produced in the amorphous material 14 by the combination of the diaphragm 6, the piston 7 and the spring 10 of the pressure sensor 1. The compressive stress is then converted into a corresponding electrical signal, and such conversion will be described below with reference to experimental data illustrated in FIGS. 21e to 21h.

Referring to FIGS. 21a to 21d, a pair of strips 14 of an amorphous, magnetically soft metal material are integrally joined together by an epoxy adhesive. Two of such assemblies are integrally joined to a substrate 30 of an epoxy resin while maintaining a parallel relationship between the assemblies. The resulting core 26 has its left-hand end clamped in a vise 81 with the amorphous material 14 placed on the bottom side of substrate 30. A dial gauge (not shown) is located at a distance of 5 mm from the right-hand end of the core 26 to determine the voltage $V_x$ and the time delay $t_d$ with respect to the deflection z of the core 26 in the Y-direction. A push-pull gauge (not shown) is used with the core 26 in place to apply a load thereto in the Y-direction, thus determining the voltage $V_x$ and the time delay $t_d$ with respect to the compressive load y. The dimentions a to e and the amorphous material used as well as the corresponding data are indicated as Cases No. 11 to 14 in the Table 3 listed above. In Case No. 11, the data of FIG. 21e indicates that a voltage $V_x$ of a high accuracy can be obtained for a deflection from 0 to 3 mm while in Case No. 12, the data of FIG. 21f indicates that a time delay $t_d$ having a good linearity and exhibiting a large change can be obtained for ranges of the deflection from 0 to 0.8 mm and from 0.9 to 2 mm. In Case No. 13, the data of FIG. 21g indicates that a voltage $V_x$ of a high accuracy is obtained for the compressive load y from 0 to 150 g. In Case No. 14, the data of FIG. 21h indicates that a time delay $t_d$ having a good linearity and exhibiting a large change is obtained for ranges of the compressive load y from 0 to 0.1 kg and from 0.2 to 0.35 kg.

Figure 22:
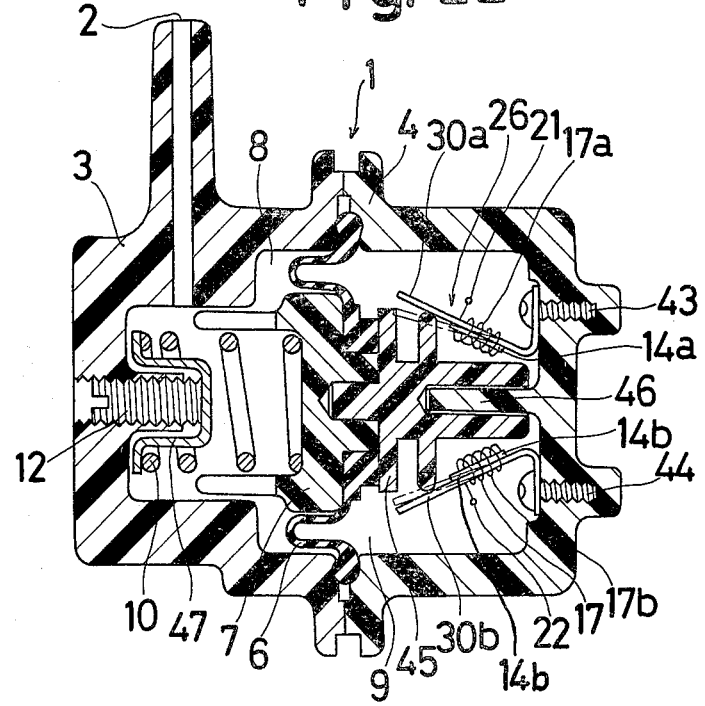
FIG. 22 is a longitudinal cross-sectional view of a pressure sensor according to a twelfth embodiment of the invention.

Twelfth Embodiment (FIG. 22)

In the pressure sensor 1 of FIG. 22, a pair of elastic members 30a, 30b, are disposed as shown and have their one end secured to the body 4 by means of bolts 43, 44. A pair of amorphous, magnetically soft metal material members 14a, 14b are integrally joined to the bottom surface of the elastic member 30a and to the upper surface of the elastic member 30b, respectively, at their other end, thus defining the core 26. A coil 17a is disposed on the amorphous material 14a while a coil 17b is disposed on the amorphous material 14b. The coil 17b is connected in series with the coil 17a, but is wound in the opposite direction from the coil 17a. The series combination of the coils 17a, 17b defines the coil 17.

A slider 45 is fixedly mounted on the right-hand end of the piston 7, and is slidable along the bottom surface of the elastic member 30a and the upper surface of the elastic member 30b. The body 4 is formed with a guide 46 which guides the slider 45 for axial displacement. The spring 10 is compressed by a retainer 47 which is positioned by an adjustment of the screw 12. Initially, the screw 12 is adjusted so that when the atmospheric pressure prevails in the first inner space 8, the slider 45 is displaced to the position shown where it bears against the tip of left-hand end of the guide 46 to urge the individual elastic members 30a, 30b to be spread apart so that an initial tensile stress of an equal magnitude is produced in the respective amorphous materials 14a, 14b which are integrally joined with these elastic members. When a negative pressure is introduced into the first inner space 8 through the inlet 2, the diaphragm 6 and the piston 7 are displaced in accordance with the magnitude of the negative pressure against the resilience of the spring 10, in a direction to reduce the first space 8 or to the left. The displacement of the piston 7 and the slider 45 causes the individual elastic members 30a, 30b to be displaced to their phantom line positions where the uging effect upon them is reduced. Consequently, the tensile stress produced in the respective amorphous materials 14a, 14b decreases from their initial value by an equal amount which depends on the magnitude of the negative pressure. When the coils 17a, 17b are wound in opposite directions and connected in series with each other, any adverse influence of an external magnetic field can be cancelled out, allowing an electrical signal which corresponds to the negative hydraulic pressure to be obtained with high accuracy. The pressure sensor 1 shown in FIG. 22 can be used in combination with one of the electrical processing circuits 100, 120, 140 or logical processing unit 160 to derive an electrical signal which corresponds to the negative hydraulic pressure.

Figure 23:
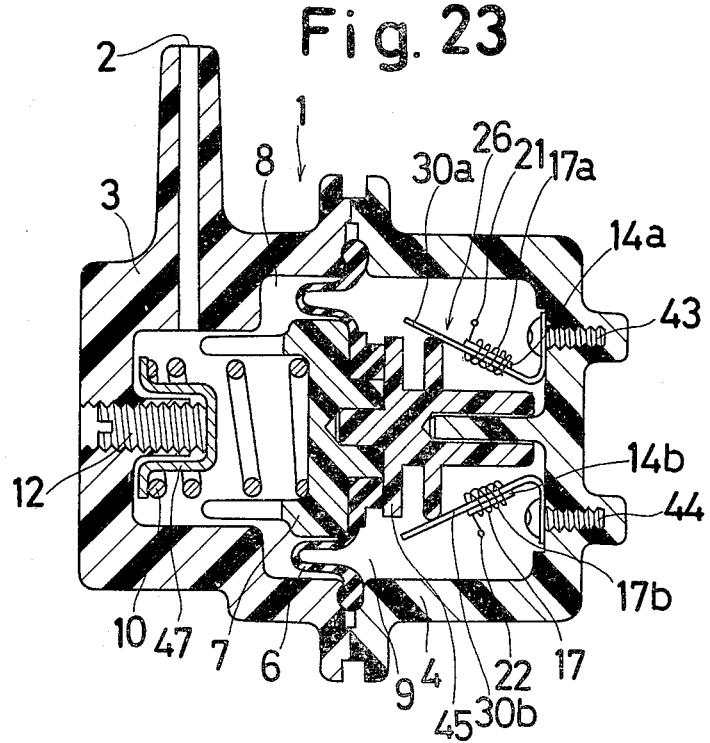
FIG. 23 is a longitudinal cross-sectional view of a pressure sensor according to a thirteenth embodiment of the invention.

Thirteenth Embodiment (FIG. 23)

The pressure sensor 1 shown in FIG. 23 is similar to the sensor of FIG. 22 except that the amorphous material 14a is applied to the upper surface of the elastic member 30a and the amorphous material 14b is applied to the lower surface of the amorphous material 14b, both in an integral manner to define the core 26. With this arrangement, when the atmospheric pressure prevails in the first inner space 8, an initial compressive stress of an equal magnitude is produced in the respective amorphous materials 14a, 14b. When a negative pressure is introduced into the first inner space 8 through the inlet 2, the slider 45 is displaced in accordance with the magnitude of the negative pressure to reduce the urging effect upon the elastic members 30a, 30b, whereby the compressive stress produced in the individual amorphous materials 14a, 14b decreases from each respective value by an equal amount. The pressure sensor 1 shown in FIG. 23 can be used in combination with one of the electrical processing circuits 100, 120, 140 or logical processing unit 160 to derive an electrical signal which corresponds to the negative hydraulic pressure.

While the described embodiments have dealt with the determination of a negative hydraulic pressure, it should be obvious that a pressure sensor detecting a change in the positive pressure can be obtained by disposing the spring which biases the diaphragm and the piston in the second inner space in which the atmosphere is confined or a given pressure is maintained or communicates. Also, the pressure sensor can detect a liquid pressure in place of or in addition to a gas pressure.

Having now fully set forth both the structure and operation of preferred embodiments of the concept underlying the present invention, various other embodiments as well as certain variations and modifications of the embodiments herein shown and described will obviously occur to those skilled in the art. It is to be understood, therefore, that within the scope of the appended claims, the invention may be practiced otherwise than as specifically set forth herein.

What is claimed as new and desired to be secured by Letters Patent is:

1. A pressure sensor comprising:
   a casing;
   a movable body located within said casing to divide the interior of the casing into a first space and a second space;
   a fluid port disposed in communication with the first space;
   spring means for biasing the movable body in a direction opposite to a pressure applied through the fluid port;
   a core comprising an amorphous, magnetically soft metal material connected to the movable body, the movable body acting to produce a stress in the core;
   an electrical coil disposed on the core for detecting the stress produced therein; and
   detection means for applying a predetermined pulse voltage to said electrical coil to saturate said core and for detecting changes in the permeability of said magnetically soft core material as a result of said stress acting on said magnetically soft core material, comprising means for producing an output signal indicative of the pressure applied through the fluid port based on the time between application of said pulse voltage and saturation of said core.

2. A pressure sensor according to claim 1 in which the core comprises:
   an elastic member; and
   a member of an amorphous, magnetically soft metal material integrally joined to the surface of said elastic member.

3. A pressure sensor according to claim 1 in which the movable body comprises:
   a diaphragm; and
   a piston fixedly connected to said diaphragm, the core being connected to the piston.

4. A pressure sensor according to claim 1, further comprising:
   said core disposed within the second space.

5. A pressure sensor according to claim 1, in which the movable body comprises:
   means for producing a predetermined initial stress in the core.

6. A pressure sensor according to claim 5, further comprising:
   another core comprising an amorphous magnetically soft metal material arranged such that a stress produced in one of the cores increases from an initial stress level while a stress produced in the other core decreases from an initial stress value as the movable body moves.

* * * * *